(12) United States Patent
Klein et al.

(10) Patent No.: US 9,294,560 B2
(45) Date of Patent: Mar. 22, 2016

(54) SYSTEM AND METHOD OF ANALYSING TRANSFER OF DATA OVER AT LEAST ONE NETWORK

(75) Inventors: Daniel Paul Leon Klein, London (GB); Neil Meikle, London (GB); Simon Ellett Page, St. Albans (GB); Jessica Hanefa Mufazzil, London (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 13/376,224

(22) PCT Filed: Jun. 4, 2010

(86) PCT No.: PCT/GB2010/050940
§ 371 (c)(1),
(2), (4) Date: Dec. 5, 2011

(87) PCT Pub. No.: WO2010/140003
PCT Pub. Date: Dec. 9, 2010

(65) Prior Publication Data
US 2012/0079109 A1    Mar. 29, 2012

(30) Foreign Application Priority Data

Jun. 4, 2009 (EP) .................................. 09275041
Jun. 4, 2009 (GB) .................................. 0909594.4

(51) Int. Cl.
*G06F 15/173* (2006.01)
*H04L 29/08* (2006.01)
*H04L 12/26* (2006.01)

(52) U.S. Cl.
CPC .............. *H04L 67/104* (2013.01); *H04L 67/06* (2013.01); *H04L 43/12* (2013.01)

(58) Field of Classification Search
CPC ............. H04B 2203/5441; H04B 3/58; H04L 43/0888; H04L 67/104
USPC ............................... 726/28; 370/356; 709/224
See application file for complete search history.

(56) References Cited

U.S. PATENT DOCUMENTS 5,915,019 A * 6/1999 Ginter et al. ..................... 705/54
6,108,782 A * 8/2000 Fletcher et al. ............... 713/153
(Continued)

FOREIGN PATENT DOCUMENTS

EP     1 063 833 A2    12/2000
EP     1 583 281 A1    10/2005
(Continued)

OTHER PUBLICATIONS

International Search Report (PCT/ISA/210) issued on Nov. 29, 2010, by European Patent Office as the International Searching Authority for International Application No. PCT/GB2010/050940.
(Continued)

*Primary Examiner* — Christopher Biagini
*Assistant Examiner* — Clarence McCray
(74) *Attorney, Agent, or Firm* — Scully, Scott, Murphy & Presser, P.C.

(57) ABSTRACT

A system and method are disclosed for analyzing transfer of data over at least one network, including a device configured to select a subset of users from a user base of at least one network. The system can include a device configured to analyze data relating to potential unlicensed data transfer by the subset of users, and a device configured to generate an estimate of unlicensed data transfer by the user base based on the analysis of data of the subset of users.

36 Claims, 12 Drawing Sheets

(56) References Cited

U.S. PATENT DOCUMENTS

| | | | |
|---|---|---|---|
| 6,401,118 B1 | 6/2002 | Thomas | |
| 6,477,580 B1 * | 11/2002 | Bowman-Amuah | 709/231 |
| 6,549,949 B1 * | 4/2003 | Bowman-Amuah | 709/236 |
| 6,633,878 B1 * | 10/2003 | Underwood | 1/1 |
| 6,671,818 B1 * | 12/2003 | Mikurak | 714/4.21 |
| 6,742,015 B1 * | 5/2004 | Bowman-Amuah | 718/101 |
| 6,839,751 B1 * | 1/2005 | Dietz et al. | 709/224 |
| 7,051,212 B2 * | 5/2006 | Ginter et al. | 713/193 |
| 7,100,199 B2 * | 8/2006 | Ginter et al. | 726/4 |
| 7,224,272 B2 * | 5/2007 | White et al. | 370/419 |
| 7,328,345 B2 * | 2/2008 | Morten et al. | 713/176 |
| 7,363,278 B2 * | 4/2008 | Schmelzer et al. | 705/67 |
| 7,441,261 B2 * | 10/2008 | Slater et al. | 725/96 |
| 7,443,803 B2 * | 10/2008 | Su et al. | 370/252 |
| 7,496,670 B1 | 2/2009 | Givoly | |
| 7,516,492 B1 * | 4/2009 | Nisbet et al. | 726/27 |
| 7,554,930 B2 * | 6/2009 | Gaddis et al. | 370/254 |
| 7,562,396 B2 * | 7/2009 | Merkle et al. | 726/30 |
| 7,590,746 B2 * | 9/2009 | Slater et al. | 709/229 |
| 7,822,862 B2 * | 10/2010 | Slater et al. | 709/229 |
| 7,870,153 B2 * | 1/2011 | Croft et al. | 707/781 |
| 7,917,749 B2 * | 3/2011 | Ginter et al. | 713/164 |
| 7,949,677 B2 * | 5/2011 | Croft et al. | 707/781 |
| 8,089,895 B1 * | 1/2012 | Mackie | 370/252 |
| 8,166,160 B2 * | 4/2012 | Gerber et al. | 709/224 |
| 8,238,669 B2 * | 8/2012 | Covell et al. | 382/224 |
| 8,441,574 B2 * | 5/2013 | Dunn et al. | 348/460 |
| 8,533,851 B2 * | 9/2013 | Ginter et al. | 726/27 |
| 8,543,842 B2 * | 9/2013 | Ginter et al. | 713/194 |
| 8,582,567 B2 * | 11/2013 | Kurapati et al. | 370/356 |
| 8,613,015 B2 * | 12/2013 | Gordon et al. | 725/34 |
| 2002/0069370 A1 | 6/2002 | Mack | |
| 2002/0087885 A1 | 7/2002 | Peled et al. | |
| 2002/0138511 A1 * | 9/2002 | Psounis et al. | 707/501.1 |
| 2002/0188710 A1 | 12/2002 | Duffield et al. | |
| 2003/0037010 A1 | 2/2003 | Schmelzer | |
| 2003/0095660 A1 * | 5/2003 | Lee et al. | 380/231 |
| 2004/0193943 A1 * | 9/2004 | Angelino et al. | 714/4 |
| 2005/0004873 A1 * | 1/2005 | Pou et al. | 705/51 |
| 2005/0154678 A1 | 7/2005 | Schmelzer | |
| 2005/0154680 A1 | 7/2005 | Schmelzer | |
| 2005/0154681 A1 | 7/2005 | Schmelzer | |
| 2005/0198061 A1 | 9/2005 | Robinson et al. | |
| 2005/0220023 A1 | 10/2005 | Kodialam et al. | |
| 2005/0251486 A1 | 11/2005 | Nair | |
| 2005/0289219 A1 * | 12/2005 | Nazzal | 709/203 |
| 2006/0198313 A1 | 9/2006 | Kitamura et al. | |
| 2007/0033408 A1 | 2/2007 | Morten | |
| 2007/0076505 A1 * | 4/2007 | Radtke et al. | 365/222 |
| 2007/0087756 A1 * | 4/2007 | Hoffberg | 455/450 |
| 2007/0149243 A1 * | 6/2007 | Hwang et al. | 455/551 |
| 2008/0059216 A1 | 3/2008 | Fromentoux et al. | |
| 2008/0133767 A1 * | 6/2008 | Birrer et al. | 709/231 |
| 2008/0141379 A1 | 6/2008 | Schmelzer | |
| 2008/0154730 A1 | 6/2008 | Schmelzer et al. | |
| 2008/0155116 A1 | 6/2008 | Schmelzer | |
| 2008/0219181 A1 | 9/2008 | Kodialam et al. | |
| 2008/0228654 A1 * | 9/2008 | Edge | 705/71 |
| 2008/0256086 A1 * | 10/2008 | Miyoshi et al. | 707/10 |
| 2009/0016246 A1 * | 1/2009 | Battin et al. | 370/310 |
| 2009/0077673 A1 | 3/2009 | Schmelzer | |
| 2009/0083132 A1 * | 3/2009 | Doganaksoy et al. | 705/11 |
| 2009/0133079 A1 | 5/2009 | Li et al. | |
| 2009/0232012 A1 | 9/2009 | Zseby | |
| 2009/0254971 A1 * | 10/2009 | Herz et al. | 726/1 |
| 2009/0328236 A1 | 12/2009 | Schmelzer | |
| 2010/0142446 A1 * | 6/2010 | Schlicht et al. | 370/328 |
| 2010/0211789 A1 * | 8/2010 | Dolganow et al. | 713/171 |
| 2012/0072593 A1 * | 3/2012 | Kim | 709/224 |
| 2012/0079109 A1 * | 3/2012 | Klein et al. | 709/224 |

FOREIGN PATENT DOCUMENTS

| | | | | |
|---|---|---|---|---|
| EP | 1 729 447 A1 | 12/2006 | | |
| WO | WO 02/082271 A1 | 10/2002 | | |
| WO | WO 02082271 A1 * | 10/2002 | | |
| WO | WO 2005/074597 A2 | 8/2005 | | |
| WO | WO 2008/064356 A | 5/2008 | | |
| WO | WO 2009026049 A2 * | 2/2009 | | H04L 9/32 |

OTHER PUBLICATIONS

European Search Report for EP 09275041 dated Mar. 17, 2010.
United Kingdom Search Report for UK dated.
C. Soldani, "Peer-to-Peer Bevhaviour Detection by TCP Flows Analysis", University of Liege, Academic May 14, 2004, pp. 1-52.
Detica, "Consultation on legislation to address illicit P3P file sharing, Detica response", Sep. 28, 2009, 15 pages.
T. Karagiannis et al., "Is P2P dying or just hiding", Global Telecommunications Conference, Nov. 29, 2004, 7 pages.
Notification Concerning Transmittal of Copy of International Preliminary Report on Patentability (Forms PCT/IB/326 and PCT/IB/373) and the Written Opinion of the International Searching Authority (Form PCT/ISA/237) issued on Dec. 15, 2011, in the corresponding International Application No. PCT/GB2010/050940.

* cited by examiner

Notes:
1. The infringement metric "contours" (CI-90, CI-80, CI-70) indicate improvements such that the overall measure of infringement is 90%, 80% and 70% respectively, when compared to the baseline.

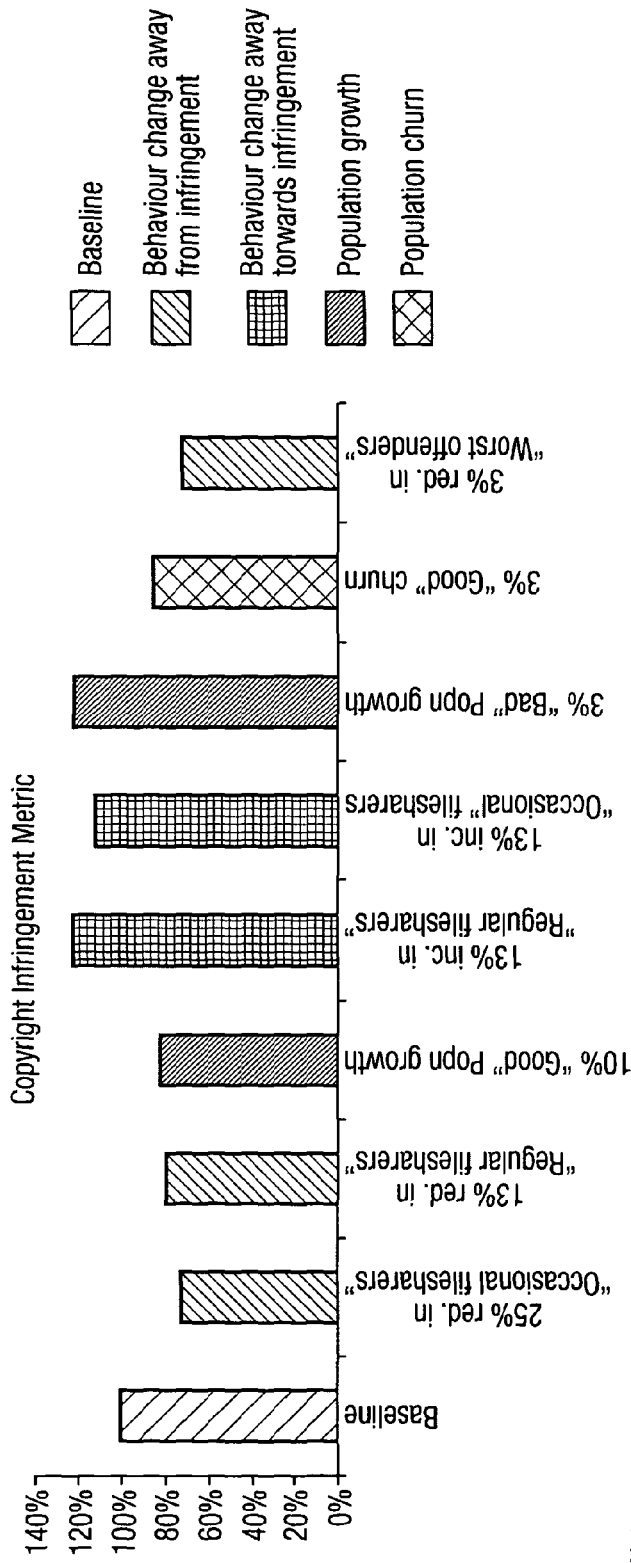

Fig. 12.

Notes:
1. Reduction in occasional filesharers refers to a 25% reduction in the overall proportion of infringers, all of which exhibit very low rates of infringement, and conversion of these individuals into non-infringers.
2. Reduction in regular filesharers refers to a 25% reduction in the overall proportion of infringers, all of which exhibit medim rates of infringement.
3. "Good" population growth describes net additions to the total population with less propensity to infringe than the current customer base.
4. Increase in regular filesharers refers to a conversion of non-infringing population into filesharers with a medium level of infringement.
5. Increase in regular filesharers refers to a conversion of non-infringing population into filesharers with a very low level of infringement.
6. "Bad" population growth describes net additions to the total population with more propensity to infringe than the current customer base.
7. "Good" churn describes an overall reduction in population where the churned population had a higher propensity to infringe.
8. Reduction in worst offenders describes the situation where these are converted into non-infringers or excluded from the metric calculation.

SYSTEM AND METHOD OF ANALYSING TRANSFER OF DATA OVER AT LEAST ONE NETWORK

The present invention relates to analysing transfer of data over at least one network.

Unlicensed transfer of media is rife on the internet. Such transfers can damage a rights holder financially and often constitute copyright infringement. This activity is particularly common on peer-to-peer (P2P) networks. It is normally impractical to police for unlicensed transfers manually on such networks and a system that assists with identifying potential unlicensed transfers is desirable.

To date there has been no accurate method for quantifying the true scale of illicit data transfer, e.g. via file sharing, over time. Attempts so far have been narrowly focussed on specific content or a limited set of applications. Existing solutions operate "above the network" and track only a small sample of P2P uploaders across a limited set of protocols. Thus, such attempts cannot provide governments or other bodies with an accurate view of the overall problem. Further, it is not possible to gauge the true efficacy of remedial actions taken (such as consumer notifications/warnings) to reduce infringement.

Embodiments of the present invention are intended to address the issues outlined above.

According to one aspect of the present invention there is provided a system configured to analyse transfer of data over at least one network, the system including:

a device configured to select a subset of users from a user base of at least one network;

a device configured to analyse data relating to potential unlicensed data transfer by the subset of users, and a device configured to generate an estimate of unlicensed data transfer by the user base based on the analysis of data of the subset of users.

The system may further include a device configured to receive a copy of at least some data transferred via the at least one network by the user base, that copy data being transformed for use as the data relating to potential unlicensed data transfer by the subset of users. The device configured to receive the copy data may include a deep packet inspection probe. The device configured to receive the copy data may include a device for identifying potentially licensed data within the transferred data.

The device configured to receive the copy data may generate anonymised data relating to the transferred data so that information identifying users associated with the transferred data is not permanently stored or subsequently processed by the system. The anonymisation may include removing information that potentially identifies a said user from the copy data, e.g. IP and/or MAC addresses can be replaced by pseudorandomly-generated values. The device configured to receive the copy data may operate in a "lights out" mode normally involving no human intervention (except, for instance, under strictly defined processes for configuration, maintenance and support, during which no live traffic passes through network-level components of the system). The device configured to select; the device configured to analyse and the device configured to generate an estimate may be located onboard apparatus remote from the device configured to receive the copy data.

The system may further include a device configured to compute an unlicensed data transfer metric for the user base based on an estimate of a number of users in the user base who have performed unlicensed data transfers, and an estimate of a number of unlicensed data transfer events performed by users in the user base.

According to another aspect of the present invention there is provided a method of analysing transfer of data over at least one network, the method including:

selecting a subset of users from a user base of at least one network (502);

analysing data relating to potential unlicensed data transfer by the subset of users, and generating an estimate of unlicensed data transfer by the user base based on the analysis of data of the subset of users.

The selection of the subset of users can include comparing levels of potentially unlicensed data transfer of users in the user base against a threshold. The level of potential unlicensed data transfer may be based on a difference between a measure/estimate of volume of potentially unlicensed data transferred by a said user and a measure/estimate of total volume of data transferred by the user over a period of time. The level of potential unlicensed data transfer may be based on a measure/estimate of a volume of unlicensed content data transferred by a said user and a measure/estimate of a volume of unlicensed traffic data by the user. The volumes of data may relate to data transferred in a particular manner, e.g. via a P2P protocol.

The step of analysing data may include computing indications of unlicensed data transfer events performed by the users in the subset. The method may further include computing an estimate of the users in the subset who have performed at least one unlicensed data transfer. The method may further include extrapolating an estimate of a number of unlicensed data transfer events performed by the user base based on the indications of unlicensed data transfer events performed by the users in the subset. The method may further include extrapolating an estimate of a number of users in the user base who have performed at least one unlicensed data transfer based on the estimate of the users in the subset who have performed at least one unlicensed data transfer. The method may further include generating a confidence interval relating to the estimate of the number of unlicensed data transfer events performed by the user base and the estimate of the number of users in the user base who have performed at least one unlicensed data transfer. The confidence interval may be generated using a bootstrapping technique. The method may further include normalising the estimate of the number of unlicensed data transfer events performed by the user base and the estimate of the number of users in the user base who have performed at least one unlicensed data transfer based on values relating to value of the data transferred.

The method may further include computing an unlicensed data transfer metric for the user base based on an estimate of a number of users in the user base who have performed unlicensed data transfers, and an estimate of a number of unlicensed data transfer events performed by users in the user base. The metric ($M_a$) can be calculated using a formula:

$$M_a = \left[\frac{Nb^c}{Nb}\right] \times \left[\frac{E^c_{Nb}}{Nb}\right]$$

where Nb represents a number of users in the user base, $Nb^c$ represents an estimate of the users who have performed at least one unlicensed data transfer event, and $E_{Nb}{}^c$ represents an estimate of a number of unlicensed data transfer events performed by the user base.

The method may further include a relative metric representing the unlicensed data transfer metric against a baseline. The relative metric ($M_r$) can be calculated using a formula:

$$M_r = \frac{\left[\frac{Nb^c}{Nb}\right]^n}{\left[\frac{Nb^c}{Nb}\right]^0} \times \frac{\left[\frac{E_{Nb}^c}{Nb}\right]^n}{\left[\frac{E_{Nb}^c}{Nb}\right]^0}$$

The method can further include anonymising data relating to the data transferred by the users so that data identifying the users is not permanently stored or processed in subsequent steps of the method. The at least one network can comprise the internet. The user base may comprise users of the internet located in a particular geographical region, e.g. the United Kingdom. The user base can comprise users of at least some internet service providers operating/based in a particular geographical region.

According to yet another aspect of the present invention there is provided a computer program product comprising a computer readable medium, having thereon computer program code means, when the program code is loaded, to make the computer execute a method of analysing transfer of data over at least one network substantially as described herein.

According to yet another aspect of the present invention there is provided a system/method of analysing transfer of data over a network, wherein anonymised data relating to data transferred over the network is generated so that information identifying users associated with the transferred data is not permanently stored and/or subsequently processed by the method/system.

According to yet another aspect of the present invention there is provided a system/method of analysing transfer of data over a network, wherein an unlicensed data transfer metric for a network user base is generated, the metric being based on an estimate of a number of users in the user base who have performed unlicensed data transfers, and/or an estimate of a number of unlicensed data transfer events performed by users in the user base. According to an alternative aspect of the present invention there is provided a method of analysing transfer of media over a network, the method including steps of:

calculating a value representing a likelihood of unlicensed data transfer on a network, wherein the calculation involves variables selected from a set including:

a measure or estimate of an amount of transfer of unlicensed media;

a measure or estimate of commercial value of media;

a measure or estimate of a number of subscribers being sampled for identifying transfer of media;

a measure or estimate of movement of encrypted media, and/or a measure or estimate of user behaviour indicative of unlicensed transfer or media.

The method may include obtaining a measurement of an amount of transfer of unlicensed media and this may include comparing the transferred media with a database of known media to identify the media (e.g. using fingerprint or watermark techniques). The method may include rebuilding the transferred media from separate data packets. The method may include monitoring status of users and comparing the status with their entitlement to move media over the network, which may be a P2P network. Each file transferred by over the (P2P) network may have an associated unique file identifier (UFI). Each said media asset may have a plurality of associated UFIs. Each file (and therefore UFI) may include multiple media assets.

The method may further include analysing information sourced from at least one client application of a P2P or private network.

The method may include, for each upload/download on the (P2P) network:

extracting the UFI from the network traffic;

comparing the extracted UFI against a local and central cache of known media UFIs; and if the comparison indicates that the extracted UFI is unknown, then the method can involve sampling and storing content from the media transfer.

The method may further include analysing the stored content (e.g. at a centralised processor/location) by comparing it with a database of known media fingerprints (e.g. content fingerprint, watermark) and, if the stored content is recognised then the UFI of the extracted media transfer is added to a central store.

If the media is found to be unlicensed and the user is also unlicensed for the (P2P) network then the media transfer is recorded as unlicensed/an infringement and the IP address may be extracted from the traffic and linked to a user identifier obtained from an Internet Service Provider (ISP) based on the user's session information. Information about the transfer and the sampled content may be retained in a secure evidence store. For P2P protocols that encrypt content (but not the UFI), the UFI only may be used to identify the content. The UFI database may be continually updated with new relationships and content identifications derived from both global databases of information and continual harvesting of UFIs traded via P2P networks in the ISP. The solution can be scaled horizontally and vertically through distributed, highly scalable hardware probes, the intelligent separation of UFI database caches (local, central, global) and a centralised fingerprinting function.

The method may include applying a weighting to different media types. The weighting may be determined by calculating the estimate of the commercial value of the media based on an average current market rate of licensed versions of the media. The commercial value estimate calculation may use a model including factors selected from a set including: Media type; Rights holder; Release/Pre-release; Age/Freshness; Genre; Perceived popularity; Probability of lost sale. The calculation may be based on both a unique broadband subscriber basis and a media asset basis.

The method may include calculating the estimate of the number of subscribers being sampled for identifying transfer of media. The method may collect data from a specified set of ISP network links where sample size is related to factors selected from a set including: Percentage of overall network traffic sampled; Percentage of network coverage; Percentage of time sampled per link. The number of subscribers calculation may include comparing against user coverage: Percentage of an individuals user traffic sampled at any point in time; Percentage of overall population sampled in a given period. A time of the sampling may be varied across a population base of the network either randomly or by sampling of all users over all times-of-day within a given period. A level of how representative is the sample can then be calculated as a statistical confidence with respect to an entire bandwidth envelope of the ISP.

The method may include calculating a measure or estimate of movement of encrypted media. This may involve statistical measurement of movement of encrypted media by searching for inbound/outbound web pages, protocols used, ports opened and/or subscriber behaviours that give an indication of unlicensed transfer of media.

The method may include calculating the estimate of user behaviour indicative of unlicensed transfer or media by analysing user behaviour indicative of attempt to avoid controls intended to prevent movement of unlicensed media; analysing for use of IP spoofing; analysing for proxy avoidance; analysing for use of protocol encryption and/or analysing for use of closed authentication networks.

According to another aspect of the present invention there is provided a method of analysing media transferred over a network including:

analysing media being transferred over a network in order to obtain an identifier associated with the media;

comparing the identifier with a set of data identifying media content in order to identify content of the media being transferred.

The step of analysing the media may be implementing by rebuild and linking of the identifier close to the network, e.g. at a network probe.

The method may be implemented at a centralised fingerprinting function.

According to another aspect of the present invention there is provided a method of analysing media being transferred over a network, the method including analysing transfer of encrypted media files in order to provide a measure or estimate of movement of encrypted media files.

The method may include searching for user behaviours indicative of transfer of unidentified media files.

According to yet another aspect of the present invention there is provided a computer program product comprising a computer readable medium, having thereon computer program code means, when the program code is loaded, to make the computer execute methods of analysing data being transferred over a network substantially as described herein.

According to another aspect of the present invention there is provided apparatus configured to execute methods of analysing data being transferred over a network substantially as described herein.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which.

Figure 1:
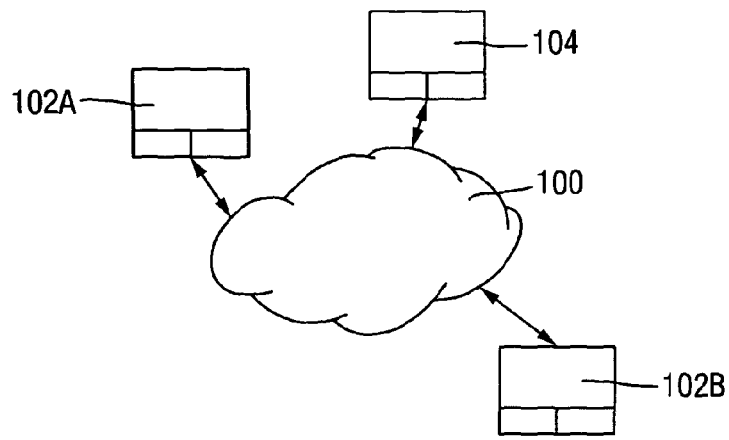
FIG. 1 illustrates schematically a communications network.

FIG. 1 illustrates schematically a communications network 100, which comprises a peer-to-peer (P2P) network that enables users to connect their computers and share media/files directly with other users without having to go through a centralized server. Several examples of such networks are currently in use on the internet, e.g. BitTorrent, Gnutella and eDonkey. A plurality of users (two users 102A, 102B are shown in the example) connect to the network using suitable software that allows them to transfer media in the form of files between each other.

As discussed above, such networks are prone to abuse and can be used for unlicensed transfer of media, which can be an infringement of copyright law. In an embodiment of the system described herein, a monitoring device 104 is also in communication with the network 100. The device may be a conventional computer having a processor and memory that is configured to execute the steps described herein, or communicate with a remote system that will perform these steps.

Figure 2:
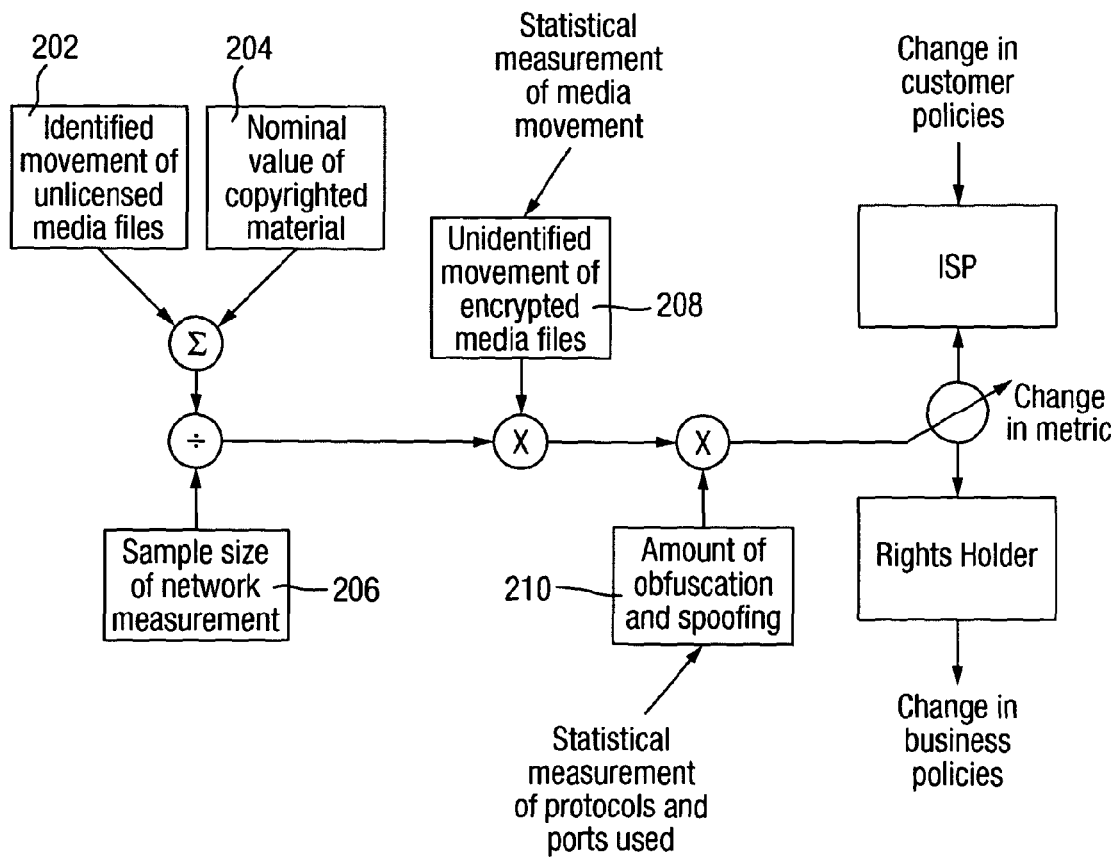
FIG. 2 illustrates a first scheme for computing an infringement metric for media being transferred across the network.

Referring to FIG. 2, a schematic drawing of steps performed by the monitoring system 104 is shown. The steps are intended to compute a "copyright infringement metric" that is indicative of the level of potential unlicensed transfer of media that is occurring in the network at a given time. The metric is representative of the nominal value of infringed material from a specified set of rights holders moving over an ISP network by individual subscribers of that network per time period. This nominal value can be broken out for each rights holder, potentially giving a metric per media type per rights holder.

At step 202, identified movement of unlicensed media is estimated or measured. This step can involve rebuilding individual electronic versions of music, film, games, books, software applications, etc, that move across the internet/network in the form of several individual packets. Such media can be looked up against a database of known identifiers of the rebuilt file, which can be based on existing technology, e.g. digital/audio fingerprint, watermark, etc. This look-up can be performed by the device 104, or at a remote device in communication with it. A check can then be carried out to confirm whether or not the media file is unlicensed. It is possible to scale these operations for national broadband provider by implementing the rebuild and linking to the identification as close to the network as possible, e.g. at a network probe.

The operations of step 202 can also involve analysing the status of subscribers, e.g. monitoring whether they move media over each P2P network that is being monitored according to the entitlements they have been set by the network operator. Each file transferred by a P2P network can have a unique file identifier (UFI) associated with it and each media asset may have multiple UFIs associated with it. Thus, each file (and therefore UFI) may include multiple media assets. The monitoring device can perform the following operations for each upload/download on the P2P network:

Extract the UFI from the traffic

Compare the extracted UFI against a local and central cache of known UFIs

If the extracted UFI is unknown then content from the transfer is sampled and centralised, e.g. transferred to another processor in communication with device 104 for further processing. The sampled content can then be analysed against a database of known media fingerprints (e.g. content fingerprint, watermark, etc).

Alternatively, if the extracted UFI is recognised then that UFI is added to the central cache If the media asset is unlicensed and the user if also unlicensed for the P2P network then the transfer is recorded as an infringement. The IP address can extracted from the traffic and linked to the subscriber pseudonym obtained from the ISP based on session information. Information about the transfer and the sampled content may be retained in a secure evidence store.

For some P2P protocols that encrypt the content (but not the UFI), only the UFI may be used to identify the content. The UFI database can be continually updated with new relationships and content identifications derived from both global databases of information and continual harvesting of UFIs traded via P2P networks in the ISP. The above solution scales both horizontally and vertically through distributed, highly scalable hardware probes, the intelligent separation of UFI database caches (local, central, global) and a centralised fingerprinting function.

At step 204 the nominal value of media (copyrighted material) is used to compute a weighting for the media. This computation may be based on an average of the current market rate of material transmitted by legal means on the internet. All media can be valued using an industry model for valuation based on any of the following factors, for example:

Media type
Rights holder
Release/Pre-release
Age/Freshness
Genre
Perceived popularity
Probability of lost sale The base data for the valuation can be sourced from existing commercial valuations of material in legitimate markets whether based digital or traditional distribution mechanisms. The valuation can be calculated on both a unique broadband subscriber and media asset basis.

The values computed at steps 202 and 204 may be combined with a value computed at step 206. At step 206 a sample size of the network measurement is computed. This is intended to represent the number of subscribers that are on the specific broadband network 100 who are being sampled for the purposes of identifying movement of media files. The operations can involve collecting data from a specified set of ISP network links where the sample size can be related to the following, for example:

Percentage of overall network traffic sampled
Percentage of network coverage
Percentage of time sampled per link This data can then be compared against the user coverage, e.g.:

Percentage of an individual user's traffic sampled at any point in time
Percentage of overall population sampled in a given period The operations are designed to be as representative as network architecture allows in terms of user population, for instance:

Full coverage in terms of overall population (every user is sampled)
Partial or full coverage of each individual at any point in time The time of day/time of week sampling can varied across the population in various ways, e.g. randomly, or by sampling of all users over all times-of-day within a given period. The level of how representative the sample is can then be calculated as a statistical confidence with respect to the entire bandwidth envelope of the ISP.

The result of combined values computed at steps 202, 204 and 206 may be further combined with a value computed at step 208. At step 208 operations relating to analysing unidentified movement of encrypted media files are performed. This can involve a statistical measurement of movement of encrypted media files by looking for inbound/outbound web pages, specific protocols being used, specific ports being opened and/or subscriber behaviours that are considered to give an indication of the movement of specific (albeit unidentified) media files. The operations can statistically model the movement of media assets over encrypted protocols where the user identity is known. The operations can measure the following, for example:

Application protocol
User identity (IP address)
Destination identity (IP address)
Volume of payload
Timing of activity
Leading/lagging indicators, for example, visited websites A suspicion level of infringement can be calculated against the profile based on, e.g.:

Known behaviour on P2P network
Previous user behaviour, for example, known infringement
Leading/lagging indicators The media types and the numbers of assets are then calculated against a known distribution of media movements over given networks influenced by the following, for example:

Volume of encrypted transfers
Timing of activity
Profile of P2P network
Previous user behaviour The operations can overlay information collected from activity monitored at an application level on the P2P networks themselves to confirm and enhance the accuracy of the estimated infringement level for a user. The operations may interact with the network in such a way as to direct network traffic to a known destination that behaves as a client on a P2P network and directly collects data on the file that is being requested/uploaded (file identifier, file content). The accuracy of the sample is then calculated as a statistical confidence with respect to the entire volume of encrypted traffic.

The value computed at step 208 may be combined with a value computed at step 210. At step 210 a value representing an estimate or measure of the amount of obfuscation and spoofing carried out by users of the network is computed. This can involve calculating a measurement of users' behaviour intended to avoid controls implemented to ensure that they do not move unlicensed media files, e.g. measuring their use of IP spoofing, proxy avoidance, protocol encryption and/or closed authentication networks. The data output may be used by/relayed to the internet service provider and/or the rights holder of infringed material, who may then use it for decision making and/or monitoring purposes.

The operations can statistically model the behaviour of individuals and calculate a score related to, e.g.:

An individual's use of anonymous networks to evade detection

An individual's participation in anonymous networks for other users to avoid detection An individual's use of encrypted, private networks known to harbour copyrighted material An individual's use of fraudulent techniques to evade network detection and/or implicate other users, e.g. IP or MAC spoofing The operations can analyse traffic records for the following, for instance:

Evidence of parallel, anonymous network sessions within the time period of the suspected infringement Evidence of outgoing anonymous network sessions by the ISP user Evidence of encrypted, authenticated sessions to known destinations or involving large volumes of traffic An estimate of the copyright infringement that may be taking place for the individual can be calculated based on, e.g.:

Previous user history

Behavioural pattern for the anonymous or private network

Volume and time activity of traffic through the quoted means

The probability the user observed is actually the user engaging in the infringing behaviour The operations may interact with the network in such a way as to direct network traffic to a known destination that behaves as a intermediary and directly collects data on the file that is being requested/uploaded (file identifier, file content). The accuracy of the estimate will be stated as a statistical confidence with respect to the volume and time activity of relevant traffic.

Figure 3:
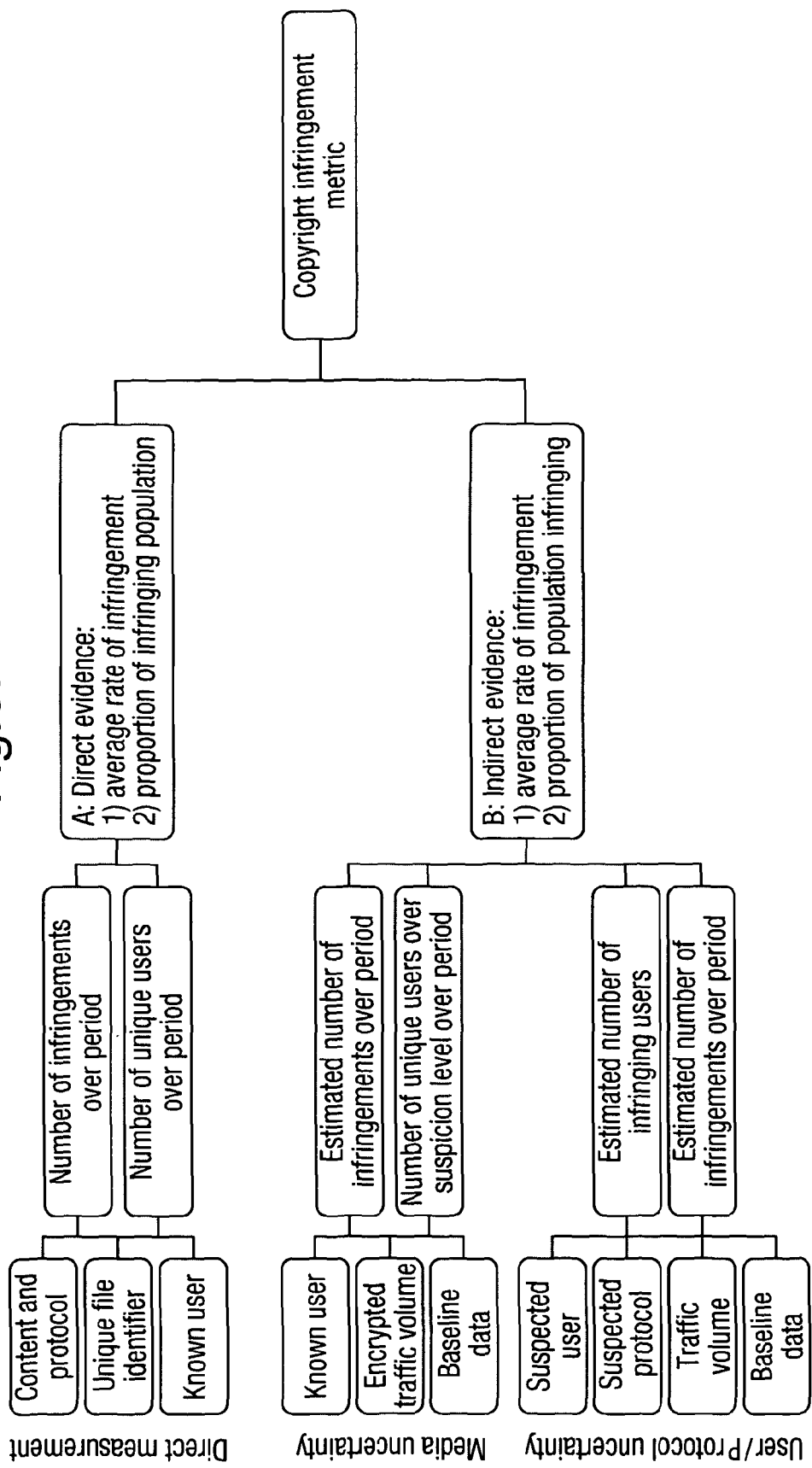
FIG. 3 is a calculation flow for the first metric computation.

The known, suspected and estimated infringement activities can be computed in terms of average nominal value of infringed material per user and the proportion of the population involved in infringing, as illustrated in FIG. 3, which can involve the computations described with reference to FIG. 2.

Figure 4:
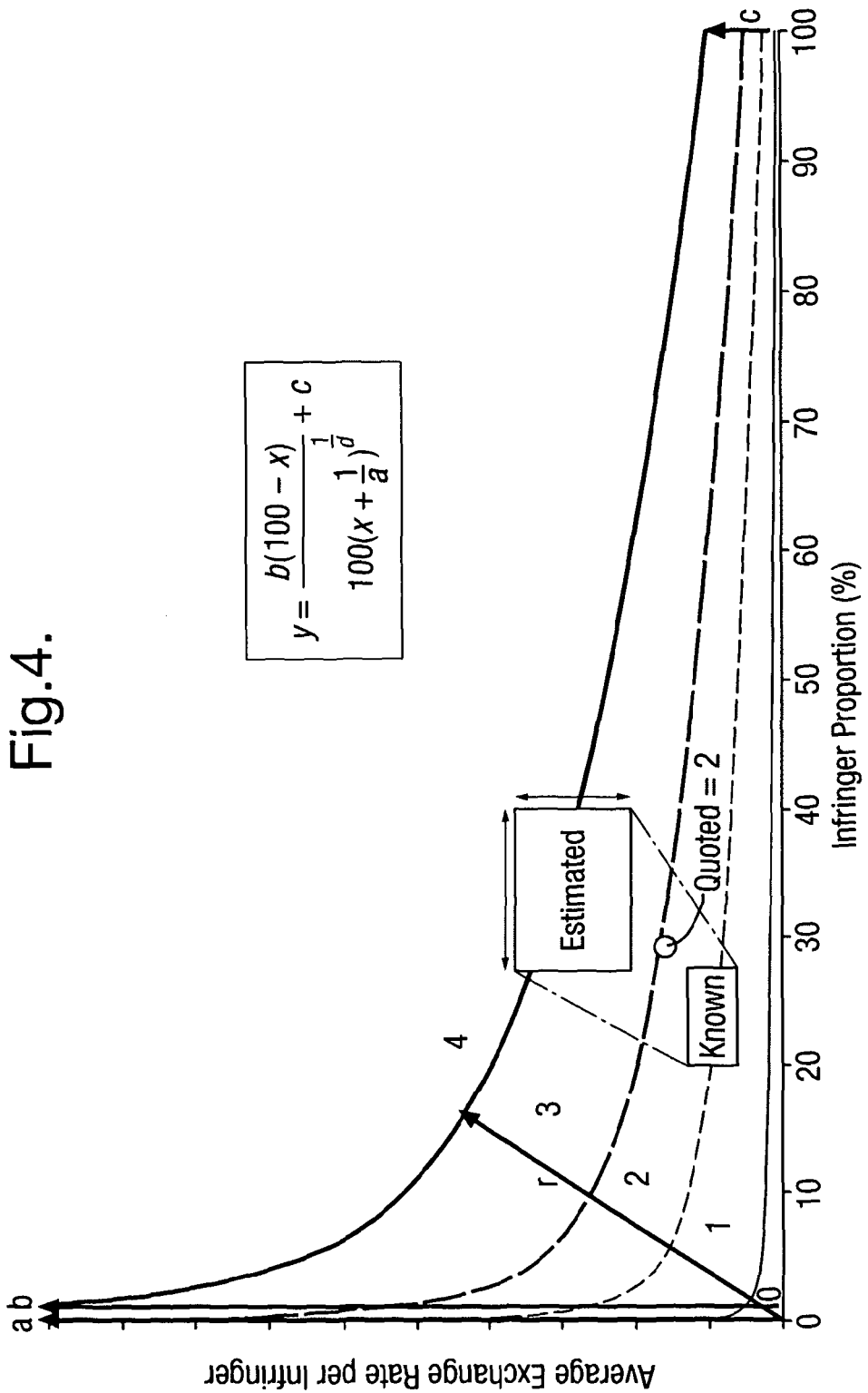
FIG. 4 is a graph illustrating the first metric.

Referring to FIG. 4, the copyright infringement metric can be based on a series of pre-determined equivalence parameters, e.g.:

the nominal metric value in a time period if a single user is involved in infringement (Parameter "a" in FIG. 4)

the nominal metric value in a time period if 1% of the population is involved in infringement (Parameter "b")

the nominal metric value in a time period if 100% of the population is involved in infringement (Parameter "c")

an 'inverse' modifier (Parameter d) defining the strength of relationship between the proportion of infringers and the average rate of infringement A series of contours are calculated based on the relationship between the average nominal value of infringements in a time period and the proportion of infringing users in the population where each contour represents a specific set of chosen parameters (a, b, c and d) where the metric is deemed to be equivalent. Each contour therefore represents a change in the value of the overall metric and can be descriptively referred to in terms of the minimum distance from the origin (parameter "r"). In the simplest case (where a→∞, b=0, and d=1) the relationship is such that the infringement metric is directly proportional to the average rate of infringement per user multiplied by the proportion of infringement. The specific values of the known, suspected and estimated activity are combined in a weighted average described as the quoted infringement value. The weights assigned to each value will be proportional based on the following, for example:

distance from the previous (more certain) measurement the inverse of the calculated error In this way if the suspected level of infringement is much higher than the known infringement level (based on a large proportion of encrypted traffic) then the weighting for the suspected infringement will also be higher; however, if the confidence interval of the suspected error is high then the weighting will be correspondingly low due to the uncertainty in the measurement. The quoted value can then be plotted with reference to the calculated contour values and assigned a value based on the two contours between which it falls.

Figure 5:
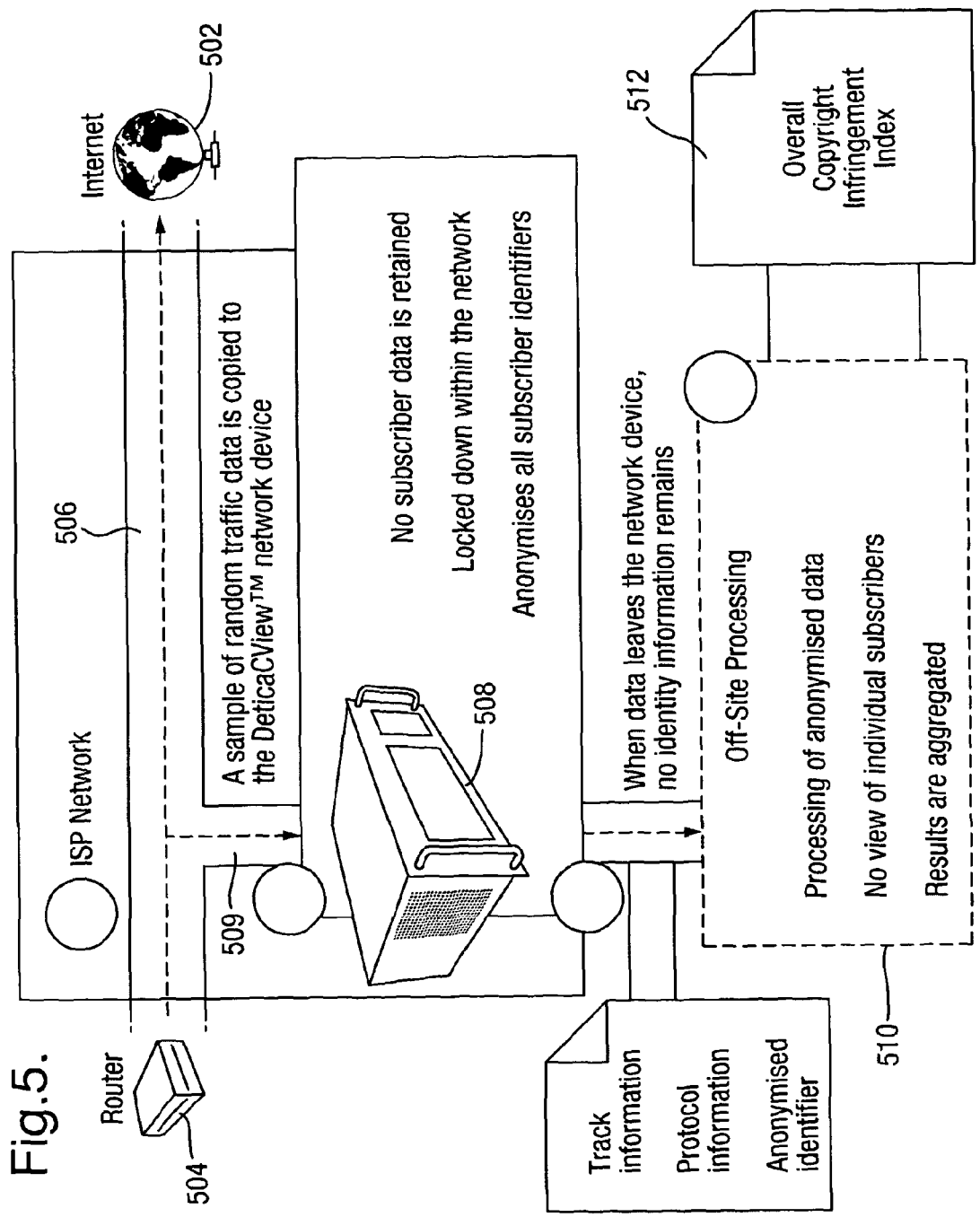
FIG. 5 is a schematic illustration of an embodiment of a data transfer analysis system.

FIG. 5 is a schematic illustration of an alternative embodiment of the data transfer analysis system. The internet 502 is made accessible to users via a broadband connection 506 connected to a router 504 provided by an ISP. Data transfer analysis technology is deployed in the form of one or more analysis devices 508, which contain deep packet inspection (DPI) probes and audio fingerprinting devices within the secure environment of the ISP network. An example of a suitable probe is StreamShield, produced by Detica of Guildford, UK. An example of a suitable fingerprinting device comprises CopySense Appliance, produced by Audible Magic Corporation, CA, USA. Each probe is connected to mirrored live traffic 509 copied from internet traffic on the connection 506. The probes can operate in "lights out" mode, i.e. with no human intervention except under strictly defined processes for product configuration, maintenance and support (during which no live traffic passes through the network-level components).

At the DPI and content identification layer, traffic volumes and infringement records are indexed by anonymised IP. In order to protect individual subscribers' right to privacy and to comply with UK legislation, data is anonymised before being made available to any person and equipment is configured to prevent remote access when live traffic data is being processed. No personal data is collected or persisted (i.e. stored). All data is anonymised at source within the DPI probes and transferred to a secure processing server 510 operated by the entity responsible for the data transfer analysis. This server aggregates individual "in-network" file sharing activity and performs analysis on this dataset using advanced statistical models and behavioural segmentation techniques. Instructions executing on the server generate an aggregated high-level metric 512 that measures and tracks the overall level of illegal file sharing based on factors such as: relative population size (i.e. the number of illegal file sharers), and relative infringement volume (i.e. the number of infringed music tracks). The measure may be considered to be an overall Copyright Infringement Index for the network. Although the embodiment is shown operating on data transferred via several ISPs over the internet, it can be adapted to operate with other networks.

The measurement carried out by the server 510 can be completely independent of any evidence collection activities which may be operated by third parties and the anti-piracy obligations and actions by ISPs (e.g. sending written notifications to identified infringers). In alternative embodiments, data relating to the measurement may be used to directly control network hardware, e.g. prevent further data transfer/network access, or store infringing data (and related evidence).

In use, the router 504 operating over the broadband Internet connection 506 is used to obtain a file being transferred by a user over a file sharing protocol. The analysis device 508 (incorporating both the DPI probe and the audio fingerprinting component) analyses a copy of the traffic for copyrighted (or other potentially unlicensed) content. All information that could identify the user is removed from collected data, e.g. the IP and MAC addresses are replaced by pseudorandom equivalents/"connection key". Real IP addresses usually never leave the network. The data is then passed to the server 510, where a set of aggregated metrics are produced to measure the level of copyright infringement on the network, which may use an anonymised SESSION ID derived from MAC address to track changes in behaviour.

Two data sources can be collected to feed into the processing pipeline:
   Network data: usage and infringement records by anonymised IP (mandatory)
   Session data: data that allows usage and infringement data to be related to a common anonymised SESSION ID derived from MAC address (so that IP refreshes are not identified as different subscribers), thereby improving the accuracy of the metric (optional)

A router connected to the network initiates a file upload or download over a file sharing protocol. The device 508 assesses specific traffic when it detects that illicit file sharing might have occurred, e.g. because of the protocol used, such as a P2P protocol. A mirrored copy of traffic data is received by the analysis device 508, ensuring that customer traffic along the connection 506 is not affected. The mirrored copy of the traffic data is never retained in the non-volatile storage device, e.g. disk, of the analysis device and is only temporarily stored in the memory buffer before being replaced by subsequent traffic data (i.e. the traffic data is deleted in less than a millisecond). In contrast to telephony, fragments of Internet Protocol (IP) data cannot be effectively analysed unless multiple (often non-sequential) fragments are reconstructed. The data fragments collected by the DPI are so small in size that individually they are rendered unusable.

Content information is determined using the audio fingerprinting device within the analysis device 508, which compares the audio fingerprint of the observed data against a database of registered fingerprints. Content metadata is logged on the device and is indexed by the file sharing identifier.

The anonymised output data is retained on the disk of the DPI in encrypted form only until completion of the scheduled data transfer process, which occurs every day, when it is deleted from the apparatus 508. The data that is sent to the server 510 does not contain any content (such as file fragments or URLs) or personally identifiable data (such as name or IP address). The data capture by the network components can be limited to the following conceptual groupings:
   Transactional records: data recording the timestamp, anonymous IP and file sharing identifier (an ID that uniquely identifies a specific P2P container, such as a BitTorrent hash) every time an item is transferred over specific file sharing protocols.
   File metadata: data describing the files being shared, e.g. filename, track name, artist name, file size, indexed by file sharing identifier.
   Usage data: because content identification is not possible on some protocols and services, data usage volumes must be collected instead for particular protocols and services. This data is indexed by anonymised IP and timestamp.

As a security precaution to limit the possibility of malicious access to data sources, anonymisation is carried out at multiple points during data collection and processing. For example, IP and MAC addresses can be anonymised using a pseudorandom replacement algorithm. The DPI device in the apparatus 508 differentiates between the IP address of the ISP subscriber from the sample population (the A-Party) and the IP-address of the other party, who may or may not be on the ISP's network (the B-Party). The DPI device can also anonymise the IP address against copyright infringement data for the A-Party immediately using a pseudorandom function on the DPI device. The B-Party's IP address is discarded in the memory of the DPI device so is never saved to disk. The real B-Party IP address is replaced in the log output with the IP address 0.0.0.0.

Even if data is maliciously accessed directly from disk on the DPI, the true IP address would not be present. In addition, the output of the DPI is encrypted using a public key, which can only be decrypted using the private key retained on the off-site server 510.

For MAC to IP mapping data, both MAC addresses and IP addresses are anonymised using software provided by the analysis system operator to the ISP. Keys maintained on the respective devices are used to replace each byte in observed IP and MAC addresses with a pseudorandom value. The key is generated using a pseudo-random algorithm that is initialised with a seed. The use of a key in the anonymisation function ensures the association between IP addresses in different subnets is preserved.

Key generation is managed automatically by a system operated by the ISP, including periodic cycling and redistribution of keys. Keys will never leave an ISP's environment. All key generation managed by the system is automatic, i.e. there is no human intervention in the process.

An audio fingerprinting device is deployed alongside selected DPI probes in order to determine information about the file that is being shared. The device reconstructs the session from the data passed to it by the DPI and extracts the media, e.g. music, file before matching it against a database of audio fingerprints. This file metadata is stored on the audio fingerprinting device before being relayed to the aggregation server. To enable the reconstruction of sessions and extraction of content for identification it is necessary to temporarily cache real IP addresses on this device. To ensure that this data can not be accessed by operators, the device has been specifically configured to prevent the display of real IP addresses in either exported data or reports presented through the administration interface. All IP addresses accessed through the audio fingerprinting device will be masked, i.e. will be shown as: \*.\*.\*.\*. Physical access to working devices during data collection will be restricted to operational ISP personnel, although these staff will not possess active login credentials.

Data is aggregated by the solution at the server 510 and at that point, it is not possible to ascertain the identity of an individual. The DPI devices can provide several logging facilities including:
   Login history for all users on the system, including when a user logs in, how long they logged in for and when they logged out.
   A SYSLOG facility which records messages from all active applications, configurable from recording only critical error messages to recording all runtime messages.
   Logging of all commands run by a superuser.

The DPI devices can also log whenever the data transfer analysis applications start or stop, which is useful for tracking if the system ever crashes during operation. The DPI can also send alarms to the ISP's Network Operations Centre.

Figure 6:
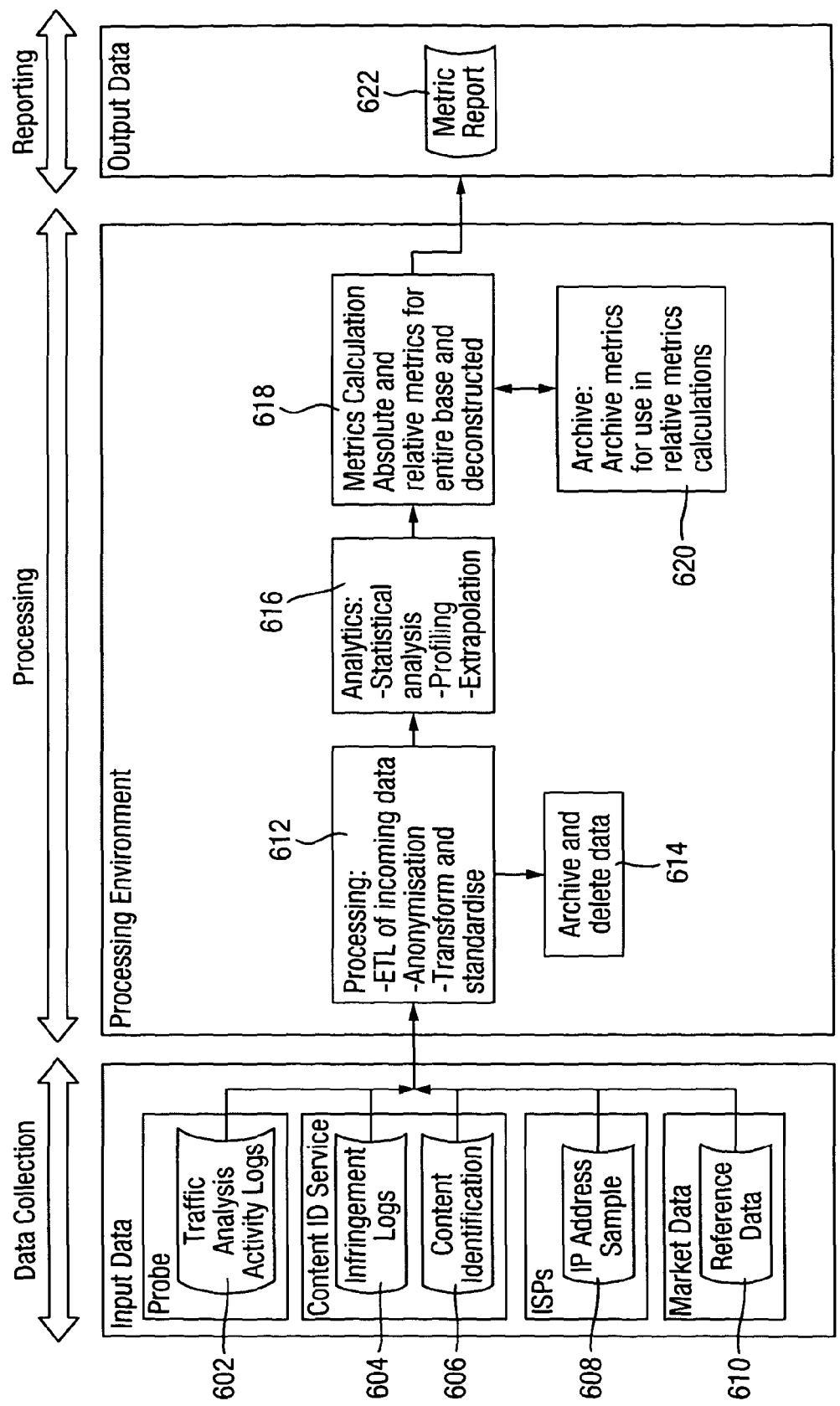
FIG. 6 is high level overview of the operation of the embodiment, including a processing step, an analytics step and a metrics calculation step.

FIG. 6 gives a high level overview of an embodiment of the data transfer analysis system. Data collected by the probes in device 508 will normally include traffic analysis activity logs 602, which contain logs of volumes of traffic uploaded and downloaded by a particular user within a particular time frame. This kind of log may be restricted to data transferred in a particular manner, e.g. via at least one P2P protocol.

Examples of data fields used in the logs include: IP addresses, volume uploaded, volume downloaded, time and protocol identifier.

An over-the-top network crawler application, such as the applications/services available from BayTSP, CA, USA, obtains data including logs 604, 606 of content downloaded by a user within a specific time period. Again, this data may be restricted to data transferred via a P2P protocol or the like. The content logged will typically comprise media, such as music or video, which can be catalogued in accessible databases. Examples of data fields used in the infringement logs 604 include: time, content identifier, protocol identifier. Examples of data fields used in the content identification logs may include, in the case of a music track: content ID, rights holder, genre/category, copyright status, volume, duration, number of sub-units, relative valuation.

Data used by the data transfer analysis system relating to a sample of IP addresses corresponding to users can be obtained via one or more ISP and may include lists 608 of IP addresses used to sample the traffic and infringement data. Examples of suitable data fields include IP address, ISP and geographical region information.

Data used by the data transfer analysis system may also include reference/market data 610 obtained from ISPs or other sources. The data can contain figures of the entire user base of an ISP and examples of suitable data fields include ISP identifier and the number in the total user base.

The processing steps carried out by the system include a pre-processing stage 612, which can involve extracting, transforming and loading the input data 602-610. An anonymisation process may also be performed, as outlined above, with some data being archived and deleted at step 614.

Step 616 represents analytical computations performed by the system, including statistical analysis and profiling of a sample of ISP users and then extrapolating outputs of those steps to obtain an estimate representative of the entire user base. At step 618 data output by step 616 is used to calculate one or more metric. In one embodiment, absolute and relative metrics for the entire user base are computed, as will be described below, which can then be deconstructed to provide a metric report output 622. Step 618 can result in metrics data being archived 620 for use in future calculations.

Figure 7:
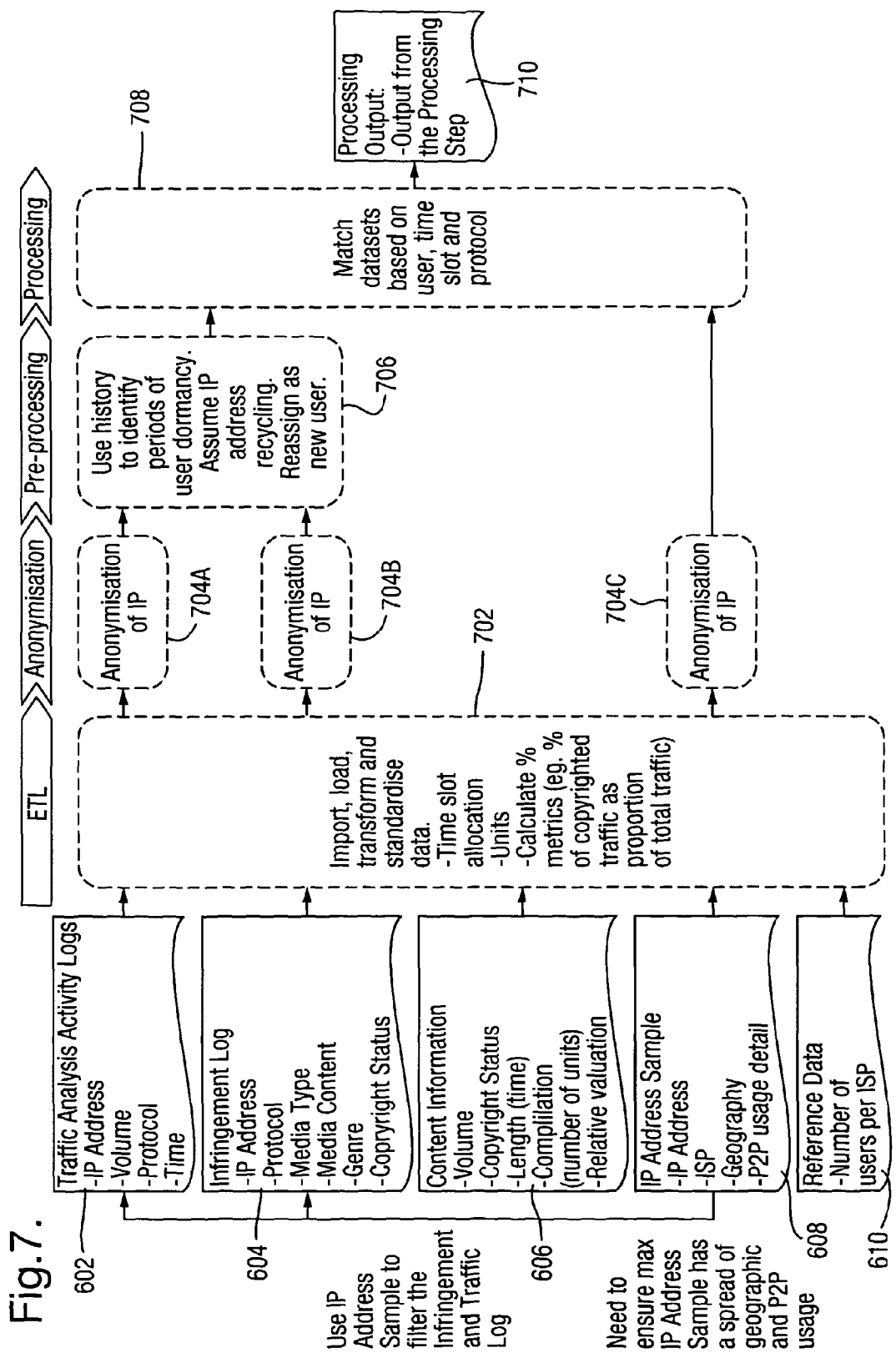
FIG. 7 shows the low level processing flow of the processing step.

FIG. 7 shows the low level processing flow of the processing step 612 outlined in FIG. 6. The input data 602-610 is extracted, transformed and loaded in order to put it in a standard format for subsequent processing steps. The operations performed on the data can include allocating time-based data a time slot code and calculating percentage metrics, e.g. the percentage of potentially unlicensed traffic as a proportion of total traffic. Steps 704A-704C can involve anonymising the data and at step 706 historical data is used to identify periods when users whose data transfer is being used for analysis were dormant. An assumption may be made that IP addresses are recycled and so IP addresses may be reassigned as a new user. At step 708 the data is matched according to user, time slot and data transfer protocol and then this data is output 710.

Figure 8:
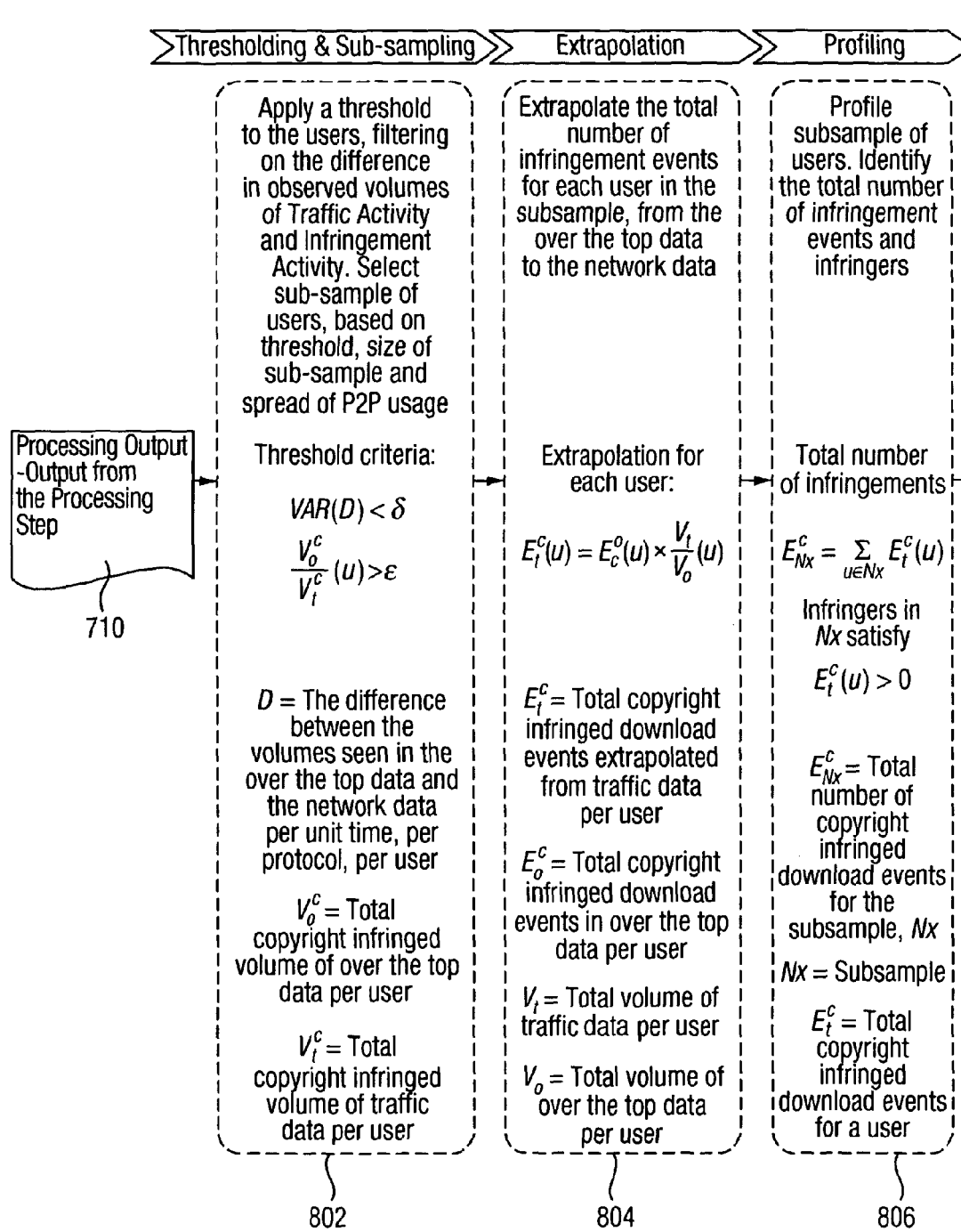
FIG. 8 shows the low level flow of operations performed during the analytics step.
Figure 8:
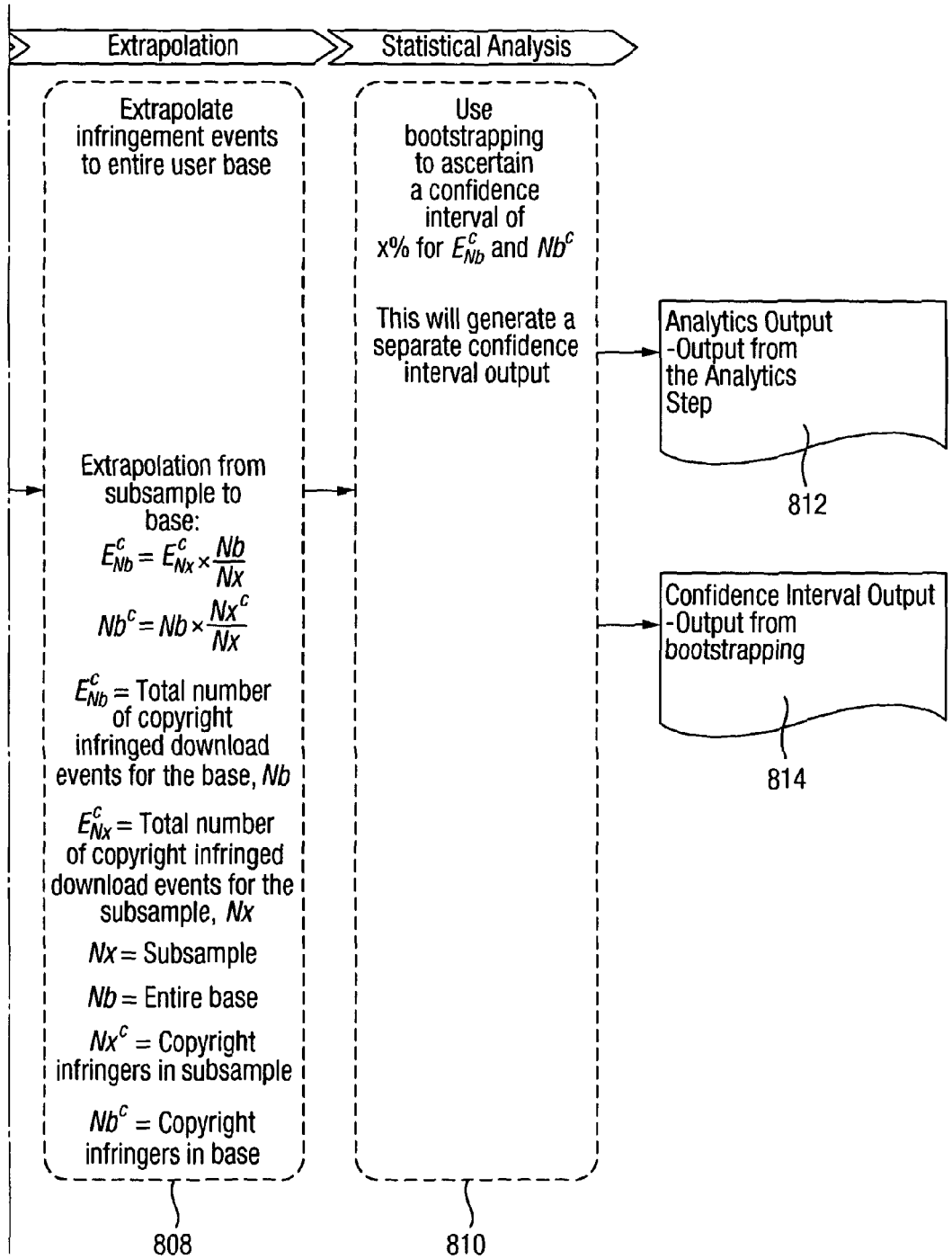

FIG. 8 shows a low level flow of operations performed during the analytics step 616 of FIG. 6. The output data 710 is received and at step 802 thresholding and sampling operations are performed. The analysis system has been designed to use a statistically significant subset of ISP subscribers, i.e. a representative sample population. Thus, if a sufficient level of the ISPs operating in a geographical region, such as a country, are included in the system then data giving an accurate picture of data transfer activities throughout that region over a period of time can be generated. The output of the metric would be statistically biased if subscriber opt-in or opt-out were offered, and as such, obtaining express user consent on a case-by-case basis has been specifically excluded from the solution. To select a subset of users from the ISP's user base, users are initially filtered based on the difference in observed volume of traffic activity and infringement activity. A subset of users is selected based on a threshold dependent upon factors such as the size of the subset and spread of P2P data transfer usage. The threshold values will be data-driven and so can be determined on a case-by-case basis. Example formulae for thresholds criteria are give in the Figure.

Next, at step 804 operations are performed in order to extrapolate the total number of infringement events for each user in the sample. An example formula for calculating the total copyright infringed download events for a user, extrapolated from the traffic data is given in the Figure.

At step 806, operations are performed in order to obtain an indication of the total number of infringing events based within the sample and also the number of users within the sample who take performed infringing/unlicensed data transfers, thereby creating a user infringement profile. Again, an example formula for calculating the total number of copyright-infringing download events for the subsample is given in the Figure.

At step 808, the figures generated at step 806 are extrapolated in order to obtain indications of the total number of infringing events and the number of users who have performed infringing data transfers for the entire user base. Example formulae are given in the Figure. At step 810 statistical analysis is performed in order to obtain a confidence interval in percentage terms for the figures generated in step 808. A known bootstrapping technique may be used for this. Bootstrapping infers the confidence interval of the number of infringements and infringers by analysis of the distribution of the number of infringements and infringers for many different resamples of the data. The user base-wide infringement estimates 812 and the confidence intervals 814 can then be output.

Figure 9:
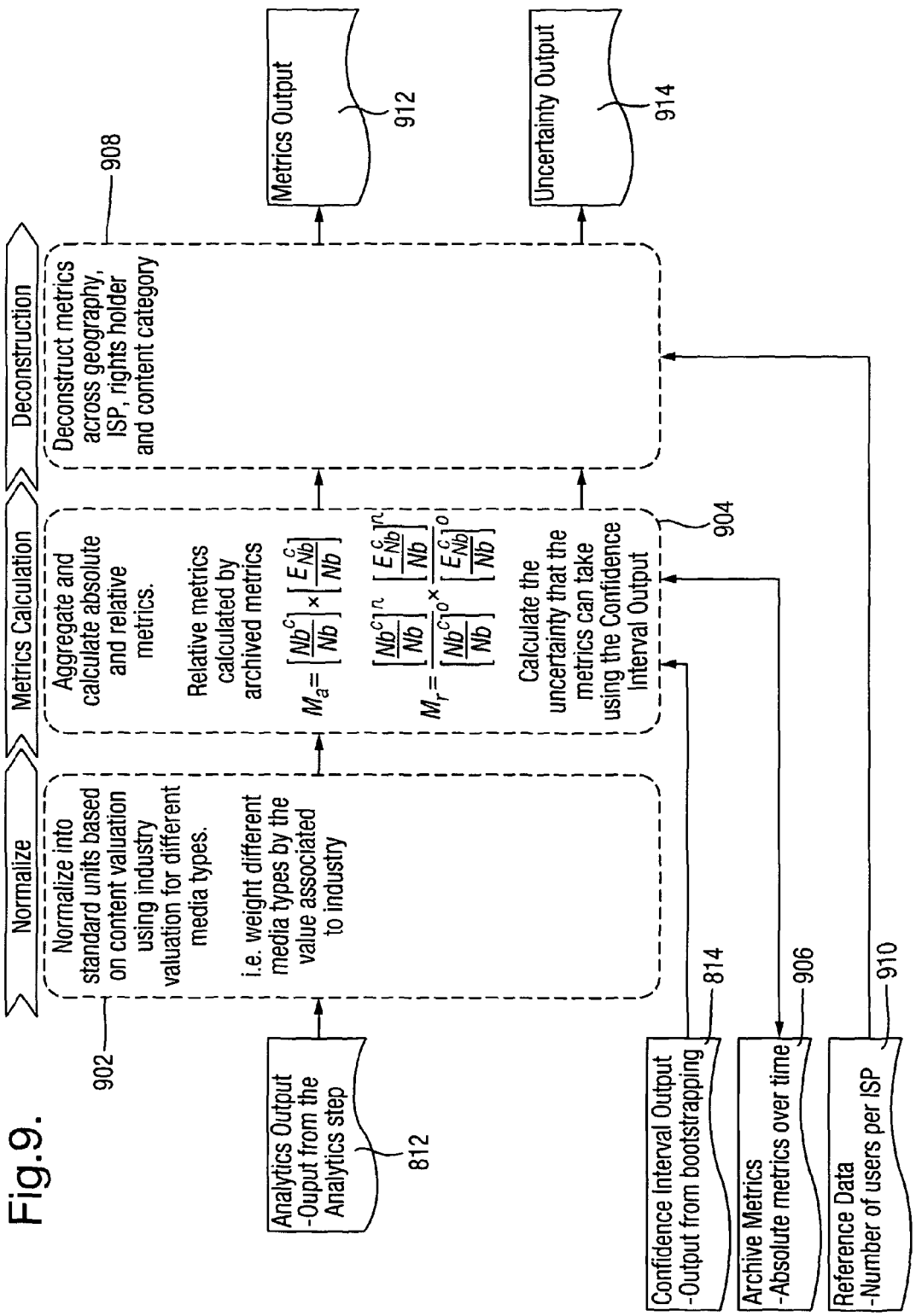
FIG. 9 shows the low level flow of operations performed during the metrics calculation step.

FIG. 9 shows a low level flow of operations performed during the metrics calculation step 618 of FIG. 6. The analytical output data 812 is received and at step 902 normalising operations are performed. The estimates of the total number of infringing events and the number of users who have performed infringing data transfers for the entire user base are normalised into standard units based on factors such as the value of the content being unlawfully transferred (e.g. using industry valuation for different media types).

At step 904 at least one metric is calculated. In the example, an absolute metric, which gives a numerical value representing the level of infringement throughout the user base (the higher the number, the higher the level of infringement) is calculated and also a relative metric, which gives a numerical value representing the level of infringement thought the user base against a base line of 100, is also calculated. In general terms, the metric is proportional to both the average rate of infringement per network user, and the proportion of the network user population that is engaged in infringement. The confidence interval output 814 and metrics data 906 archived from previous operations can be used in this step.

For completeness, a mathematical description of the calculation of the metrics will now be given. The following notation is used:

V: Volume downloaded
E: Download events
T: Timeframe of sample
P: Set of protocols being sampled
Nb: Population size of base Ns: Population size of sample
Nx: Population size of subsample
Superscript:
$^{nc}$: Not copyright infringed
$^{c}$: Copyright infringed
Subscript:
$_{t}$: Traffic data
$_{o}$: Over the top data
$_{Nx}$: Applied to the subsample
$_{Nb}$: Applied to the base
The volume downloaded by user u, at time t, under protocol p is defined as:

$$V(u,t,p) \tag{1}$$

This is the total volume downloaded by user u over the all protocols and entire time frame of sample is defined as:

$$V(u) = \sum_{\substack{\forall t \in T \\ \forall p \in P}} V(u,t,p) \tag{2}$$

The difference between the volumes of traffic and over the top data is defined as:

$$D(u,t,p) = V_t(u,t,p) - V_o(u,t,p) \; \forall u \in Ns, \forall t \in T, \forall p \in P \tag{3}$$

The traffic data and the over the top data events is made up of copyrighted and non copyrighted downloads.

$$V_t(u) = V_t^c(u) + V_t^{nc}(u) \; \forall u \in Ns \tag{4}$$

$$E_o(u) = E_o^c(u) + E_o^{nc}(u) \; \forall u \in Ns \tag{5}$$

It is assumed that each user downloads the entire file for each event:

$$V_o(u) = V_o^c(u) + V_o^{nc}(u) \; \forall u \in Ns \tag{A1}$$

Additionally, it is assumed that the proportion of copyrighted volume to all volume downloaded by the user is the same for both traffic and over the top data, i.e.:

$$\frac{V_o^c}{V_o}(u) = \frac{V_t^c}{V_t}(u) \tag{A2}$$

$$\forall u \in Ns$$

Similarly, it is assumed the proportion of copyrighted events to copyrighted volumes to be the same for both traffic and over the top data, i.e.:

$$\frac{E_o^c}{V_o^c}(u) = \frac{E_t^c}{V_t^c}(u) \tag{A3}$$

$$\forall u \in Ns$$

Rearranging (A3), the total number of copyright infringement event using the traffic data is:

$$\Rightarrow E_t^c(u) = \frac{E_o^c}{V_o^c}(u) \times V_t^c(u) \quad \forall u \in Ns \tag{6}$$

Using (A2) in this:

$$\Rightarrow E_t^c(u) = \frac{E_o^c}{V_o^c}(u) \times \frac{V_o^c}{V_o}(u) \times V_t(u) \tag{7}$$

$$\Rightarrow E_t^c(u) = E_o^c(u) \times \frac{V_t}{V_o}(u)$$

$$\forall u \in Ns$$

The above formula can be used to calculate the number of copyright infringement events extrapolated from the events in the over the top data onto the traffic data, for each user in the sample.

To maximise accuracy of the extrapolation of $E_t^c(u)$, a subsample (Nx: Nx ⊂ Ns ⊂ Nb) of users is taken which agrees with (8) (for the choice of δ and ε). This ensures that a large enough proportion of the traffic data is accounted for by the over the top data and that the coverage of over the top data is consistent (i.e. no large gaps in time where there is no over the top data):

$$VAR(D) < \delta \quad \& \quad \frac{V_o^c}{V_t^c}(u) > \varepsilon \; \forall u \in Nx \tag{8}$$

$$E_t^c(u) > 0 \quad \forall u \in Nx^c \tag{9}$$

It is also possible to define the number of infringers within the subsample, Nx as $Nx^c$. These users agree with statement (8) and the additional statement (9).

For extrapolation onto the entire base, it is initially necessary to find the number of copyrighted events in the subsample. This can be calculated as:

$$E_{Nx}^c = \sum_{u \in Nx} E_t^c(u) = \sum_{u \in Nx} E_o^c(u) \times \frac{V_t}{V_o}(u) \tag{10}$$

Thus, scaled up to the entire base, the total number of infringement events for the entire base is defined as:

$$E_{Nb}^c = E_{Nx}^c \times \frac{Nb}{Nx} \tag{11}$$

And the total number of infringers within the entire base is:

$$Nb^c = Nb \times \frac{Nx^c}{Nx} \tag{12}$$

The interval for a confidence level of x % for (11) and (12) can be ascertained by using bootstrapping.
The absolute metric can be calculated as:

$$M_a = \left[\frac{Nb^c}{Nb}\right] \times \left[\frac{E_{Nb}^c}{Nb}\right]$$

The relative metric can be calculated by comparing the metric at time t=n (i.e. the nth sample event) to the metric at time t=0 (i.e. the baselining sample event). For notation purposes [metric]$^n$ is the metric calculated at the sample event t=n. Thus, the relative metrics can be calculated for the nth sampling event by:

$$M_r = \frac{\left[\frac{Nb^c}{Nb}\right]^n}{\left[\frac{Nb^c}{Nb}\right]^0} \times \frac{\left[\frac{E^c_{Nb}}{Nb}\right]^n}{\left[\frac{E^c_{Nb}}{Nb}\right]^0} \quad (13)$$

At this point the equivalence parameters (a, b, c, and d) discussed earlier may be applied; equation (11) above demonstrates the simplest case (a=infinity, b=0 and d=1).

Returning to FIG. 9, at step 908 the metrics data can be deconstructed to provide outputs in any desired format(s). Reference data 910, including information such as the number of users of a particular ISP, may be used in this step. In one embodiment, the metrics can be deconstructed across geographical regions, ISP, rights holder of the infringed media data and content category of the infringed data. The metrics-based data can be output 912, as well as an indication of uncertainty 914 related to the metrics output. The value output at step 914 will be the minimum and maximum value of the metrics Ma, Mr when using the minimum/maximum values of the confidence interval output at step 814.

Figure 10:
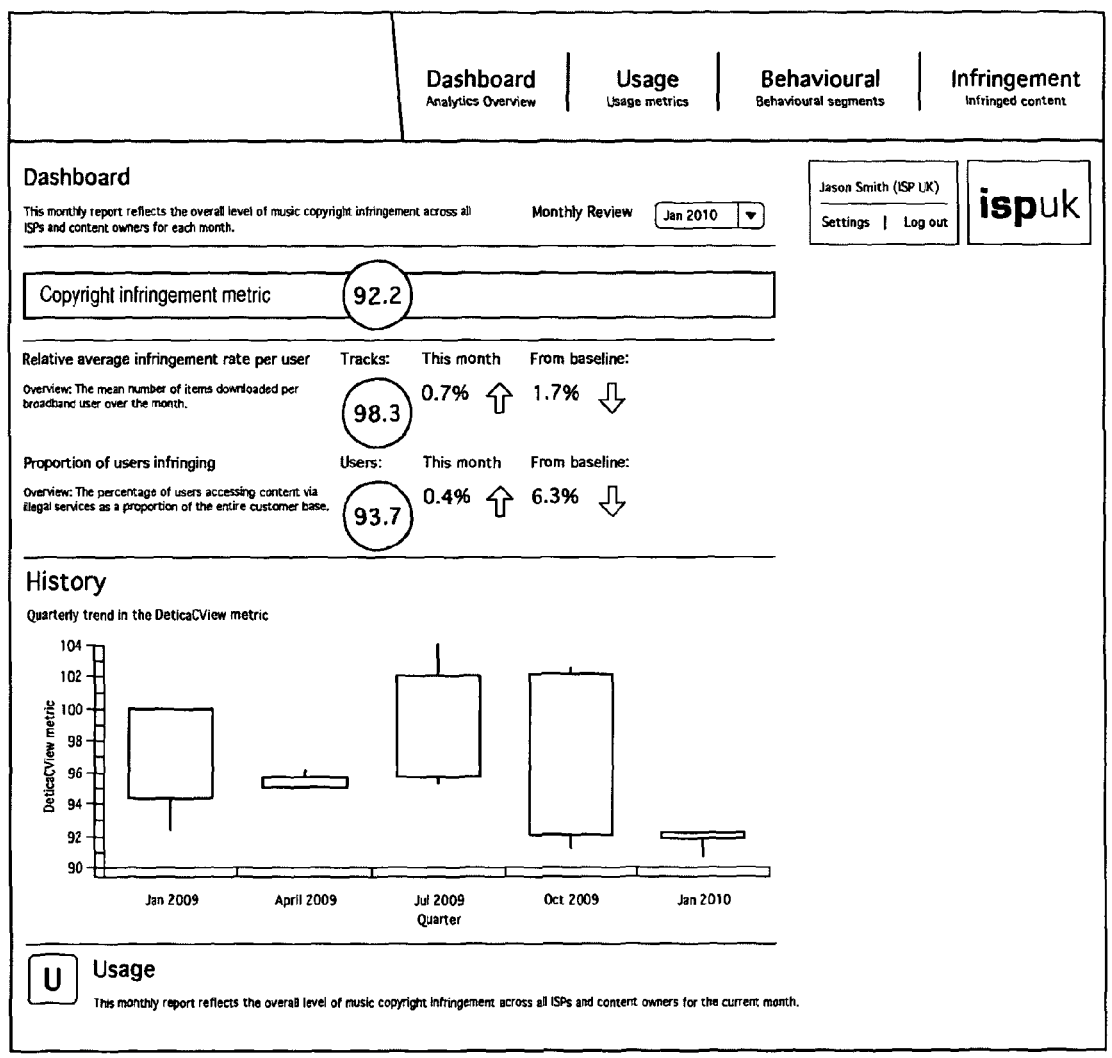
FIG. 10 shows an example screen display based on data produced by the embodiment.

FIG. 10 shows an example screen display generated by software tools configured to present the data output by the steps described above.

Figure 11:
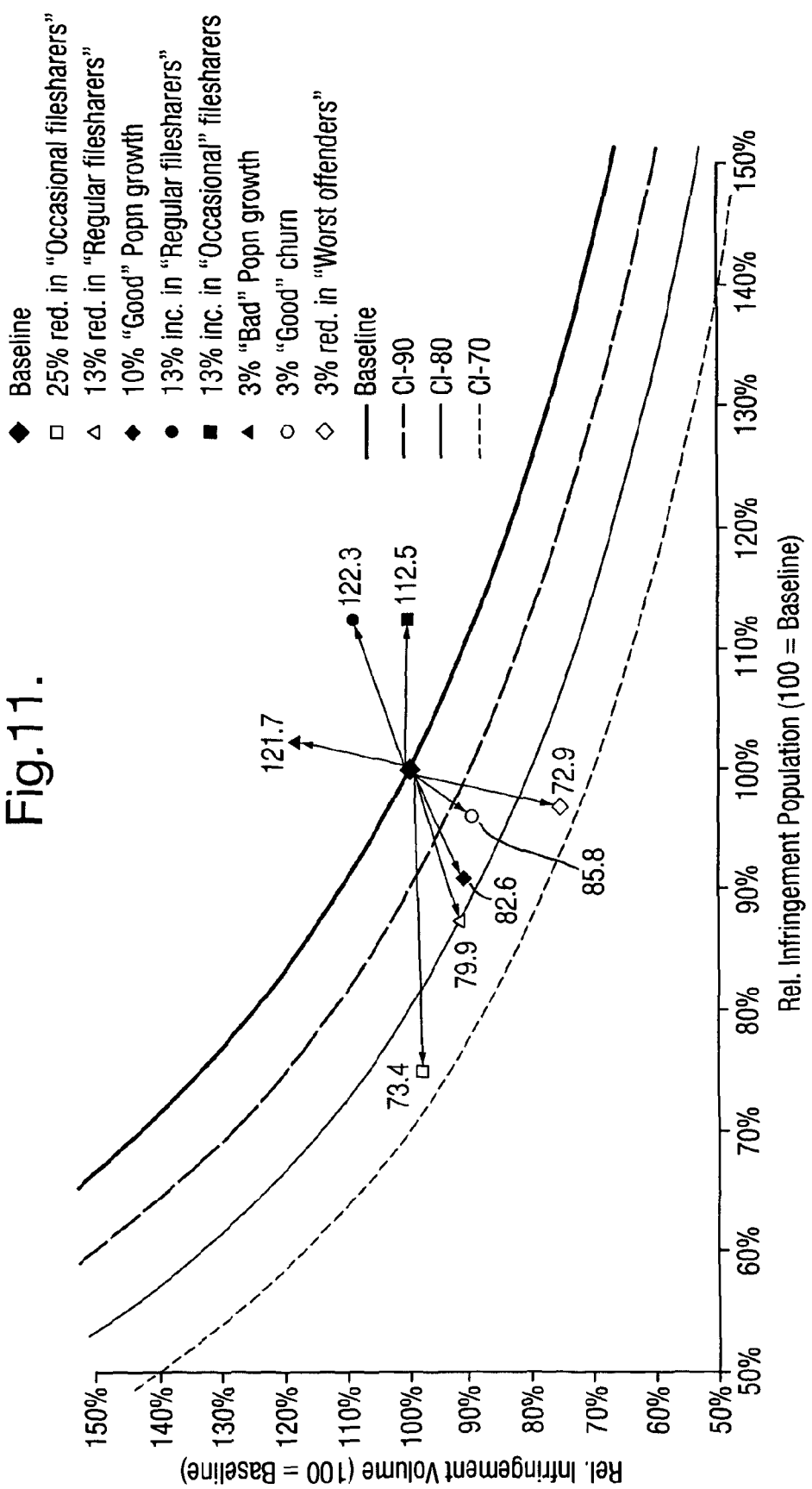
FIG. 11 is a graph illustrating an example of a relative metric generated by the embodiment, and FIG. 12 graphically illustrates effects of various changes on a baseline metric used in the metric calculation step.

FIG. 11 is a graph illustrating an example of a relative metric. Generally, the metric is relative to the amount of copyright infringement at time zero and therefore does not bias a particular network based on its starting point characteristics.

FIG. 12 graphically illustrates effects of various changes on the baseline metric used in the relative metric calculation.

The embodiments above can be used to create information that may demonstrate relative improvement in terms of reduced infringing activities without disclosing absolute figures (e.g. customer numbers). The relative metric can be measured as a relative measurement against a baseline of 100. This baseline of 100 also applies to the proportion of population as well as the overall volume of infringement. Further, the metric is agnostic with respect to the concentration of activity across certain population groups, retaining balanced incentives to drive improvement among both light and heavy abusers.

The embodiments can also create information that can demonstrate improvement if there is a decrease in infringing population or if there is a decrease in infringement volume. The metric is equally weighted between the reduction in infringing population and the reduction in overall volume of infringement. This means that a 5% reduction in the population of very occasional infringers results in a similar improvement as the reduction of a few individuals that may generate 5% of overall volume. Additionally, the information generated is able to adjust to changes in overall population without biasing the metric in one direction or another: The metric can follow the underlying distribution of the population in a relative manner. Therefore, if the overall population grows and the nature of this additional population matches that of the current population then the overall copyright infringement metric will not change.

The embodiments above can generate information that aims to clarify the true scale of illicit file sharing and its fluctuation over time, allowing all parties to understand the true level of infringement and the effectiveness of remedial actions. The overall Copyright Infringement Index produced as a metric by some embodiments measures and tracks the total volume of all illicit file sharing (including P2P) of content such as music across an ISP network over time, thereby functioning as an "in network" solution that can provide a single measure, recognisable by all industry stakeholders, as an informative view of illicit file sharing/data transfer in a particular geographical region, such as an entire country.

The invention claimed is:

1. A system configured to analyse transfer of data over at least one network, the system comprising:
   a secure analysis device, comprising a hardware processor, configured to capture samples of traffic data being transferred over the at least one network in respect of a subset of users selected from a user base of the at least one network and to analyse the samples of traffic data to identify data relating to potential unlicensed data transfer by the subset of users, wherein selection of the subset of users is based upon comparing levels of potentially unlicensed data transfer of users in the user base against a threshold; and
   a processing device, comprising a hardware processor, configured to:
   (a) receive results of the analysis by the secure analysis device of data transfers by the subset of users;
   (b) determine from the results a measured number of unlicensed data transfers, an estimated number of unlicensed data transfers and an estimated number of users having performed unlicensed data transfers;
   (c) derive at least one metric indicative of unlicensed data transfer by the user base based on the measured and estimated determinations; and
   (d) use data relating to the at least one metric to control network hardware to prevent at least one of: (i) further data transfer, and (ii) further network access.

2. A system according to claim 1, wherein the secure analysis device is configured to receive copy data of at least some data transferred via the at least one network by the user base, the copy data being transformed for use as the data relating to potential unlicensed data transfer by the subset of users.

3. A system according to claim 1, wherein the secure analysis device comprises:
   a deep packet inspection probe.

4. A system according to claim 1, wherein the secure analysis device is further configured to:
   identify, from data contained in the captured samples of traffic data, a type of content being transferred; and
   determine, with reference to predetermined reference data, whether the identified type of content is licensed or unlicensed for transfer over the at least one network.

5. A system according to claim 4, wherein the secure analysis device is further configured to identify a type of content via at least one of audio fingerprint recognition, and digital fingerprint recognition.

6. A system according to claim 1, wherein the secure analysis device is configured to anonymise data in the captured samples of traffic data that may be used to identify users associated with respective data transfers such that the data that may be used to identify users is not persistently stored.

7. A system according to claim 6, wherein the secure analysis device is configured to inhibit direct or remote access to data or functionality within the secure analysis device during any period of time when the captured samples of traffic data are being analysed.

8. The system according to claim 7, wherein the processing device is located remotely from the secure analysis device.

9. A system according to claim 1, wherein the processing device is configured to compute a metric indicative of unlicensed data transfer for the user base derived from an estimate of a number of users in the user base who have been identified by the secure analysis device as having performed one or more unlicensed data transfers, and an estimate of a number of unlicensed data transfer events performed by users in the user base.

10. A system according to claim 1, wherein the selection of the subset of users is based upon at least one threshold dependent factor, the at least one threshold dependent factor comprising a size of the subset.

11. A system according to claim 1, wherein the selection of the subset of users is based upon at least one threshold dependent factor, the at least one threshold dependent factor comprising a spread of P2P data transfer usage.

12. A method of analysing transfer of data over at least one network, the method comprising:
selecting a subset of users from a user base of the at least one network, wherein selection of the subset of users is based upon comparing levels of potentially unlicensed data transfer of users in the user base against a threshold;
analysing sample traffic data captured from the at least one network to identify data relating to potential unlicensed data transfer by the selected subset of users;
determining from the analysis a measured number of unlicensed data transfers, an estimated number of unlicensed data transfers and an estimated number of users having performed unlicensed data transfers;
generating at least one metric indicative of unlicensed data transfer by the user base derived from results of the analysed sample traffic data in respect of the selected subset of users based on the measured and estimated determinations; and
using data relating to the at least one metric to control network hardware to prevent at least one of: (i) further data transfer, and (ii) further network access.

13. A method according to claim 12, wherein the analysing of the sample traffic data comprises:
identifying, from data contained within the captured samples of traffic data, a type of content being transferred; and
determining, with reference to predetermined reference data, whether the identified type of content is licensed or unlicensed for transfer over the at least one network.

14. A method according to claim 13, comprising:
determining values of potential unlicensed data transfer identified in the analysis of the sample traffic data based on the identified content type,
wherein the generating of the at least one metric comprises deriving the at least one metric based on the determined values.

15. A method according to claim 13, wherein the data contained within the captured samples of traffic data are indicative of data transfer using a predetermined protocol.

16. A method according to claim 12, wherein the generating of the at least one metric comprises:
computing an unlicensed data transfer metric for the user base derived from an estimate of a number of users in the user base who have performed unlicensed data transfers, and an estimate of a number of unlicensed data transfer events performed by users of the user base.

17. A method according to claim 16, comprising:
computing an estimate of the users in the subset who have performed at least one unlicensed data transfer.

18. A method according to claim 17, comprising:
extrapolating the estimate of a number of unlicensed data transfer events performed by the user base based on indications of unlicensed data transfer events performed by the users in the subset.

19. A method according to claim 18, comprising:
normalising the estimate of the number of unlicensed data transfer events performed by the user base and the estimate of the number of users in the user base who have performed at least one unlicensed data transfer based on values relating to value of the data transferred.

20. A method according to claim 17, comprising:
extrapolating the estimate of a number of users in the user base who have performed at least one unlicensed data transfer based on the estimate of the users in the subset who have performed at least one unlicensed data transfer.

21. A method according to claim 20, comprising:
generating a confidence interval relating to the estimate of the number of unlicensed data transfer events performed by the user base and the estimate of the number of users in the user base who have performed at least one unlicensed data transfer.

22. A method according to claim 21, wherein the confidence interval is generated using a bootstrapping technique.

23. A method according to claim 12, comprising:
computing an unlicensed data transfer metric for the user base based on an estimate of a number of users in the user base who have performed unlicensed data transfers, and an estimate of a number of unlicensed data transfer events performed by users in the user base.

24. A method according to claim 23, comprising:
a relative metric representing the unlicensed data transfer metric against a baseline.

25. A method according to claim 12, comprising:
anonymising data in the sampled traffic data that may be used to identify users of the at least one network so that the data that may be used to identify users of the at least one network is not permanently stored.

26. A method according to claim 12, wherein the at least one network comprises the internet.

27. A method according to claim 26, wherein the user base comprises users of the internet located in a specified geographical region.

28. A method according to claim 26, wherein the user base comprises users of at least some Internet service providers operating in a specified geographical region.

29. A method of analysing transfer of data over at least one network, the method comprising:
selecting a subset of users from a user base of the at least one network, wherein selection of the subset of users is based upon comparing levels of potentially unlicensed data transfer of users in the user base against a threshold;
analysing data relating to potential unlicensed data transfer by the subset of users;
generating an estimate of unlicensed data transfer by the user base based on the analysis of data relating to potential unlicensed data transfer by the subset of users;
computing an unlicensed data transfer metric for the user base based on an estimate of a number of users in the user base who have performed unlicensed data transfers, and an estimate of a number of unlicensed data transfer events performed by users in the user base; and
using data relating to the metric to control network hardware to prevent at least one of: (i) further data transfer, and (ii) further network access;
wherein the metric ($M_a$) is calculated using a formula:

$$M_a = \left[\frac{Nb^c}{Nb}\right] \times \left[\frac{E_{Nb}^c}{Nb}\right]$$

where Nb represents a number of users in the user base, $Nb^c$ represents an estimate of the users who have performed at least one unlicensed data transfer event, and $E_{Nb}{}^c$ represents an estimate of a number of unlicensed data transfer events performed by the user base.

30. A method of analysing transfer of data over at least one network, the method comprising:
selecting a subset of users from a user base of the at least one network, wherein selection of the subset of users is based upon comparing levels of potentially unlicensed data transfer of users in the user base against a threshold;
analysing data relating to potential unlicensed data transfer by the subset of users;
generating an estimate of unlicensed data transfer by the user base based on the analysis of data relating to potential unlicensed data transfer by the subset of users;
computing an unlicensed data transfer metric for the user base based on an estimate of a number of users in the user base who have performed unlicensed data transfers, and an estimate of a number of unlicensed data transfer events performed by users in the user base, and a relative metric representing the unlicensed data transfer metric against a baseline; and
using data relating to the unlicensed data transfer metric to control network hardware to prevent at least one of: (i) further data transfer, and (ii) further network access;
wherein the relative metric ($M_r$) is calculated using a formula:

$$M_r = \frac{\left[\frac{Nb^c}{Nb}\right]^n}{\left[\frac{Nb^c}{Nb}\right]^0} \times \frac{\left[\frac{E_{Nb}^c}{Nb}\right]^n}{\left[\frac{E_{Nb}^c}{Nb}\right]^0}$$

where Nb represents a number of users in the user base, $Nb^c$ represents an estimate of the users who have performed at least one unlicensed data transfer event, and $E_{Nb}{}^c$ represents an estimate of a number of unlicensed data transfer events performed by the user base.

31. A non-transitory computer-readable recording medium having a computer program tangibly recorded thereon that, when executed by a processor of a computer, causes the processor to execute a method of analysing transfer of data over at least one network, the method comprising:
selecting a subset of users from a user base of the at least one network, wherein selection of the subset of users is based upon comparing levels of potentially unlicensed data transfer of users in the user base against a threshold;
analysing sample traffic data captured from the at least one network to identify data relating to potential unlicensed data transfer by the selected subset of users;
determining from the analysis a measured number of unlicensed data transfers, an estimated number of unlicensed data transfers and an estimated number of users having performed unlicensed data transfers;
generating at least one metric indicative of unlicensed data transfer by the user base derived from results of the analysed sample traffic data in respect of the selected subset of users based on the measured and estimated determinations; and
using data relating to the at least one metric to control network hardware to prevent at least one of: (i) further data transfer, and (ii) further network access.

32. A system configured to analyse transfer of data over at least one network, the system comprising:
a secure analysis device, comprising a hardware processor, configured to capture samples of traffic data being transferred over the at least one network in respect of a subset of users selected from a user base of the at least one network, the secure analysis device being configured to anonymise data in the captured samples of traffic data such that information identifying users associated with the captured samples of traffic data is not permanently stored and to analyse the captured samples of traffic data to identify data relating to potential unlicensed data transfer by the subset of users, the secure analysis device being configured to inhibit access to data within the secure analysis device during any period of time when the captured samples of traffic data are being analysed, wherein selection of the subset of users is based upon comparing levels of potentially unlicensed data transfer of users in the user base against a threshold; and
a processing device, comprising a hardware processor, configured to receive results of the analysis by the secure analysis device of data transfers by the subset of users, and to calculate at least one metric indicative of unlicensed data transfer by all users comprising the user base based upon the results of the analysis related to the subset of users;
wherein the processing device calculates the at least one metric by:
determining from the results: (a) a measured number of unlicensed data transfers, (b) an estimated number of unlicensed data transfers; and (c) an estimated number of users having performed unlicensed data transfers; and
determining the at least one metric based on the measured and estimated determinations; and
wherein the processing device uses data relating to the at least one metric to control network hardware to prevent at least one of: (i) further data transfer, and (ii) further network access.

33. A system according to claim 32, wherein the anonymisation includes removing information that potentially identifies a said user.

34. A system according to claim 33, wherein the anonymisation includes removing at least one of an IP and a MAC address of the user and replacing the removed addresses by pseudorandomly-generated values.

35. A system according to claim 32, wherein the secure analysis device is configured to limit access to the data during a period of time when the captured samples of traffic data are being analysed to a no human intervention mode.

36. A system according to claim 32, wherein the processing device calculates the at least one metric by an extrapolation of data from the subset of users to all users comprising the user base.

* * * * *